(12) United States Patent
Komatsu et al.

(10) Patent No.: US 12,728,822 B2
(45) Date of Patent: Sep. 8, 2026

(54) BRAKE SYSTEM AND ELECTRONIC CONTROL DEVICE

(71) Applicant: DENSO CORPORATION, Kariya-city (JP)

(72) Inventors: Shinji Komatsu, Nisshin-city (JP); Etsugo Yanagida, Kariya-city (JP); Daisuke Hokuto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 485 days.

(21) Appl. No.: 18/451,541

(22) Filed: Aug. 17, 2023

(65) Prior Publication Data

US 2023/0391299 A1 Dec. 7, 2023

Related U.S. Application Data

(63) Continuation of application No. PCT/JP2022/005055, filed on Feb. 9, 2022.

(30) Foreign Application Priority Data

Feb. 25, 2021 (JP) ................................ 2021-029095

(51) Int. Cl.

| | |
|---|---|
| ***B60T 7/04*** | (2006.01) |
| ***B60T 8/172*** | (2006.01) |
| ***B60T 13/74*** | (2006.01) |

(52) U.S. Cl.

CPC .............. *B60T 7/042* (2013.01); *B60T 8/172* (2013.01); *B60T 13/745* (2013.01); *B60T 2220/04* (2013.01)

(58) Field of Classification Search

CPC ... B60T 7/06; B60T 7/042; B60T 8/01; B60T 8/172; B60T 8/176; B60T 13/662; B60T 13/686; B60T 13/745; B60T 2220/04

(Continued)

(56) References Cited

U.S. PATENT DOCUMENTS

| | | | | |
|---|---|---|---|---|
| 2011/0202250 | A1 | 8/2011 | Miyajima et al. | |
| 2013/0289845 | A1 * | 10/2013 | Ajiro ..................... | B60T 13/745 701/70 |

(Continued)

FOREIGN PATENT DOCUMENTS

| | | | |
|---|---|---|---|
| JP | 2010280271 | A | 12/2010 |
| JP | 2022130111 | A | 9/2022 |

(Continued)

*Primary Examiner* — Robert A. Siconolfi
*Assistant Examiner* — San M Aung
(74) *Attorney, Agent, or Firm* — Nixon & Vanderhye P.C.

(57) ABSTRACT

A brake system includes a brake device, a brake circuit that generates a braking force for braking a vehicle, ECU that controls the braking force generated by the brake circuit according to a stroke amount of the brake pedal, and a user interface. When the first mode is selected, the ECU executes normal control for controlling the braking force generated by the brake circuit based on a basic characteristics which is a basic relationship between the stroke amount of the brake pedal and the braking force. When the second mode is selected, the ECU executes an automatic braking force control when the stroke amount is between a first threshold value and the second threshold value after the stroke amount of the brake pedal increases and reaches a predetermined set value. The ECU executes normal control when the stroke amount of the brake pedal becomes larger than the second threshold value.

13 Claims, 12 Drawing Sheets

(58) Field of Classification Search
USPC ........................................................ 303/113.4
See application file for complete search history.

(56) References Cited

U.S. PATENT DOCUMENTS

| | | | | |
|---|---|---|---|---|
| 2014/0008965 | A1* | 1/2014 | Ito | B60T 13/686<br>303/14 |
| 2015/0210255 | A1 | 7/2015 | Fletcher et al. | |
| 2016/0129893 | A1* | 5/2016 | Ishino | B60T 8/17<br>701/70 |
| 2020/0079338 | A1* | 3/2020 | Roh | B60T 13/146 |

FOREIGN PATENT DOCUMENTS

| | | | |
|---|---|---|---|
| JP | 2022130112 | A | 9/2022 |
| JP | 2022130113 | A | 9/2022 |
| JP | 2022130115 | A | 9/2022 |
| JP | 2022130116 | A | 9/2022 |

* cited by examiner

BRAKE SYSTEM AND ELECTRONIC CONTROL DEVICE

CROSS REFERENCE TO RELATED APPLICATIONS

This application is a continuation application of International Patent Application No. PCT/JP2022/005055 filed on Feb. 9, 2022, which designated the U.S. and based on and claims the benefits of priority of Japanese Patent Application No. 2021-29095 filed on Feb. 25, 2021. The entire disclosure of all of the above applications is incorporated herein by reference.

TECHNICAL FIELD

The present disclosure relates to a brake system mounted on a vehicle and an electronic control device used therefor.

BACKGROUND

Conventionally, there has been known a brake-by-wire system that brakes a vehicle by driving and controlling a brake circuit with a braking force (i.e., brake force) indicated by an electronic control unit based on an output signal from a sensor that detects an amount of stroke of a brake pedal. In the following description, the electronic control unit will be simply referred to as the ECU.

SUMMARY

According to one aspect of the present disclosure, a braking system mounted on a vehicle includes a brake device, a brake circuit, an electronic control unit, and a user interface. The brake device includes a brake pedal operated by pedaling force applied by the driver, and a sensor that outputs a signal corresponding to a stroke amount of the brake pedal. The brake circuit generates braking force to apply a brake to a vehicle by supplying hydraulic pressure to wheel cylinders provided to respective wheels. The electronic control unit controls the braking force generated by the brake circuit according to the stroke amount of the brake pedal detected based on an output signal of the sensor. The user interface allows the driver to instruct the electronic control unit to select a first mode or a second mode.

When the first mode is selected, the electronic control unit executes a normal control for controlling the braking force generated by the brake circuit based on a basic characteristics which is a basic relationship between the stroke amount and the braking force.

When the second mode is selected, and when the stroke amount is between a first threshold smaller than the set value and a second threshold larger than the set value after the stroke amount increases and reaches a predetermined set value, the electronic control unit executes an automatic braking force control to set the braking force generated by the brake circuit to a predetermined braking force. When the stroke amount exceeds the second threshold value, the electronic control unit executes a normal control to control the braking force generated by the brake circuit with the braking force based on the basic characteristics.

DETAILED DESCRIPTION

Figure 1:
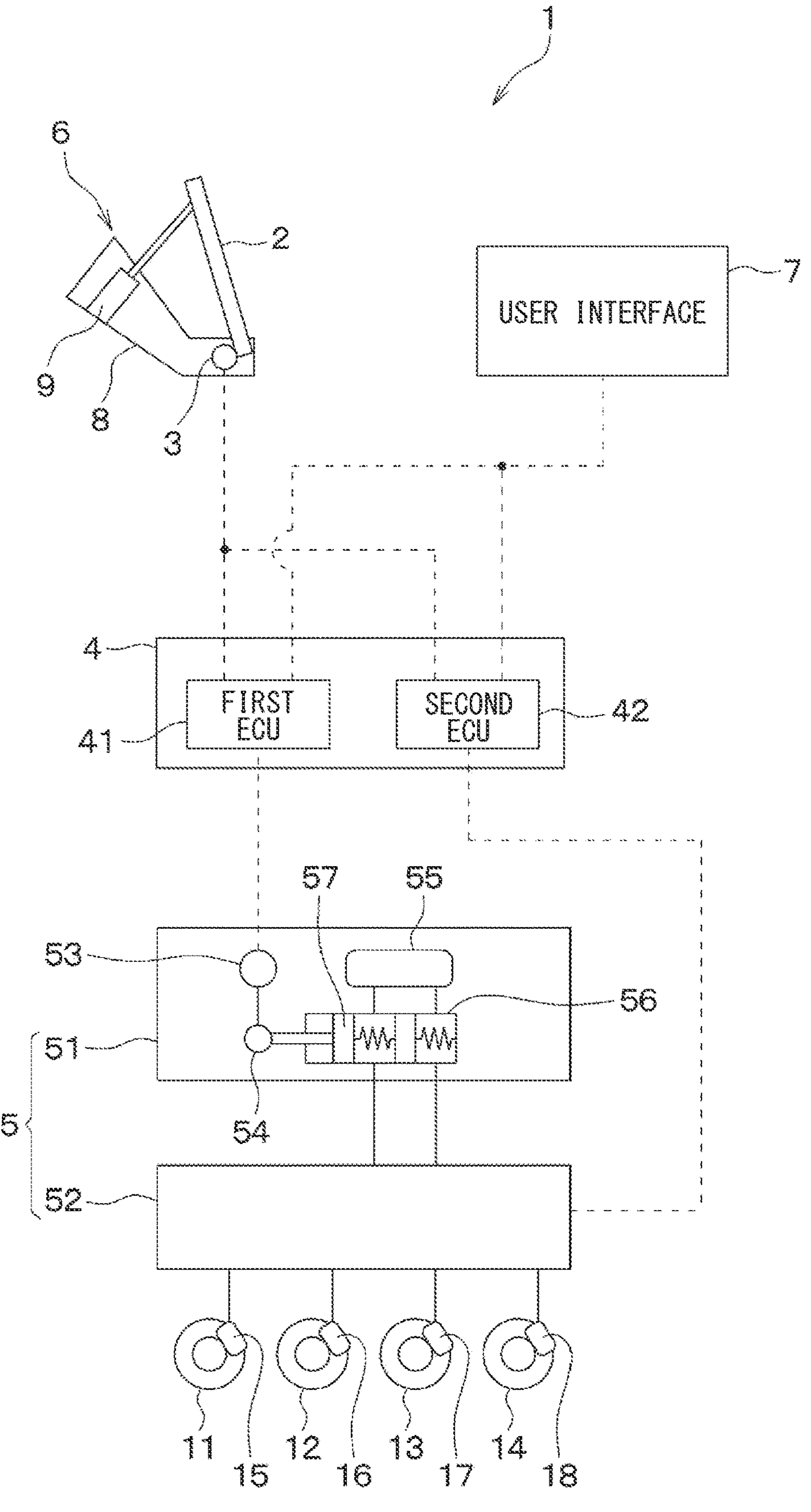
FIG. 1 is a diagram showing a configuration of a brake system according to a first embodiment.

In an assumable example, there has been known a brake-by-wire system that brakes a vehicle by driving and controlling a brake circuit with a braking force (i.e., brake force) indicated by an electronic control unit based on an output signal from a sensor that detects an amount of stroke of a brake pedal. In the following description, the electronic control unit will be simply referred to as the ECU. ECU is an abbreviation for Electronic Control Unit.

The brake system includes a brake booster device that accelerates and decelerates a vehicle, a threshold changing unit that changes a threshold for the stroke amount of the brake pedal according to deceleration of the vehicle, and a brake control unit that controls the braking force so as to achieve target deceleration. The brake control unit determines whether the stroke amount of the brake pedal exceeds or falls short from the target deceleration calculated by the ECU based on information of the stroke sensor, and controls the vehicle based on booster brake pressure requirement characteristics stored in advance in the ECU.

However, in the brake system disclosed above, the braking force generated by the brake circuit increases non-linearly according to the stroke amount of the brake pedal. Therefore, when the stroke amount of the brake pedal fluctuates due to variations in the pedaling force of the driver, the vehicle cannot be controlled with a stable braking force. When the stroke amount of the brake pedal fluctuates due to variations in the pedaling force of the driver, the braking force generated by the brake circuit fluctuates, and unintended acceleration/deceleration G acts on passengers including the driver. Therefore, a driver who wants to decelerate the vehicle with constant braking force is required to perform an intricate brake pedal operation such as continuously holding the brake pedal with a constant stroke amount in order to output the constant braking force. Thus, there is a problem in that the driver has to go through a highly stressful brake pedal operation which is a heavy burden.

An object of the present disclosure is to provide a brake system capable of improving operability of a brake pedal and reduce the stress the driver feels when operating the brake pedal.

According to one aspect of the present disclosure, a braking system mounted on a vehicle includes a brake device, a brake circuit, an electronic control unit, and a user interface. The brake device includes a brake pedal operated by pedaling force applied by the driver, and a sensor that outputs a signal corresponding to a stroke amount of the brake pedal. The brake circuit generates braking force to apply a brake to a vehicle by supplying hydraulic pressure to wheel cylinders provided to respective wheels. The electronic control unit controls the braking force generated by the brake circuit according to the stroke amount of the brake pedal detected based on an output signal of the sensor. The user interface allows the driver to instruct the electronic control unit to select a first mode or a second mode.

When the first mode is selected, the electronic control unit executes a normal control for controlling the braking force generated by the brake circuit based on a basic characteristics which is a basic relationship between the stroke amount and the braking force.

When the second mode is selected, and when the stroke amount is between a first threshold smaller than the set value and a second threshold larger than the set value after the stroke amount increases and reaches a predetermined set value, the electronic control unit executes an automatic braking force control to set the braking force generated by the brake circuit to a predetermined braking force. When the stroke amount exceeds the second threshold value, the electronic control unit executes a normal control to control the braking force generated by the brake circuit with the braking force based on the basic characteristics.

According to this configuration, when the second mode is selected by the driver and the stroke amount reaches the predetermined set value, the ECU executes an automatic braking force control to set the braking force generated by the brake circuit to a predetermined braking force. Therefore, when the automatic braking force control is executed, even if the stroke amount fluctuates due to variations in the pedaling force applied to the brake pedal by the driver, if the stroke amount is between the first threshold value and the second threshold value, a stable braking of the vehicle is achieved. Therefore, the brake system enables stable braking of the vehicle with a simple pedal operation by the driver, and can reduce the driver's stress associated with the operation of the brake pedal.

Furthermore, in this brake system, when the second mode is selected and the stroke amount becomes greater than the second threshold value, the ECU controls the braking force generated by the brake circuit with the braking force based on the basic characteristics. Therefore, this brake system does not degrade the feeling of stepping on the brake pedal even after the pedal stroke amount exceeds the second threshold when the second mode is selected and can generate the maximum braking force when the stroke amount is maximum. Therefore, this brake system can enhance the driver's sense of security and improve reliability and safety. In the present specification, the feeling of stepping on the brake pedal refers to the relationship between the pedal stroke amount and the braking force.

Another aspect of the present disclosure relates to an electronic control unit used for a brake system mounted on a vehicle. The brake system includes a brake device, a brake circuit, an electronic control unit and a user interface. The brake device includes a brake pedal operated by the pedaling force applied by the driver, and a sensor that outputs a signal corresponding to a stroke amount of the brake pedal. The brake circuit generates braking force to apply a brake to a vehicle by supplying hydraulic pressure to wheel cylinders provided to respective wheels. The electronic control unit controls the braking force generated by the brake circuit according to the stroke amount of the brake pedal detected based on an output signal of the sensor. The user interface allows the driver to instruct the electronic control unit to select a first mode or a second mode.

When the first mode is selected, the electronic control unit executes a normal control for controlling the braking force generated by the brake circuit based on a basic characteristics which is a basic relationship between the stroke amount and the braking force.

When the second mode is selected, and when the stroke amount is between a first threshold smaller than the set value and a second threshold larger than the set value after the stroke amount increases and reaches a predetermined set value, the electronic control unit executes an automatic braking force control to set the braking force generated by the brake circuit to a predetermined braking force. When the stroke amount exceeds the second threshold value, the electronic control unit executes a normal control to control the braking force generated by the brake circuit with the braking force based on the basic characteristics.

According to this configuration, the other aspect of the present disclosure can also achieve the same effects as the one aspect of the present disclosure.

Embodiments of the present disclosure will now be described with reference to the drawings. Parts that are identical or equivalent to each other in the following embodiments are assigned the same reference numerals and will not be described.

First Embodiment

A first embodiment will be described with reference to FIG. 1 to FIG. 7. A brake system 1 of the present embodiment is a brake-by-wire system in which a brake circuit 5 generates a braking force necessary for braking a vehicle under drive control of an electronic control unit 4 based on an output signal of the sensor 3 that detects a stroke amount θ of a brake pedal 2*a* mounted on the vehicle. In the following description, the electronic control unit 4 is referred to as an ECU4. ECU is an abbreviation of Electronic Control Unit. The ECU 4 include, for example, a well-known computer including a processor and a memory, its peripheral circuits, and the like. The memory is a non-transitory tangible storage medium.

First, an example of a configuration of the brake system 1 will be described.

As shown in FIG. 1, the brake system 1 includes a brake device 6 that is stepped on by the driver, a brake circuit 5 that generates a braking force for braking the vehicle, an ECU 4 that controls the driving of the brake circuit 5, and a user interface 7, and so on.

Figure 2:
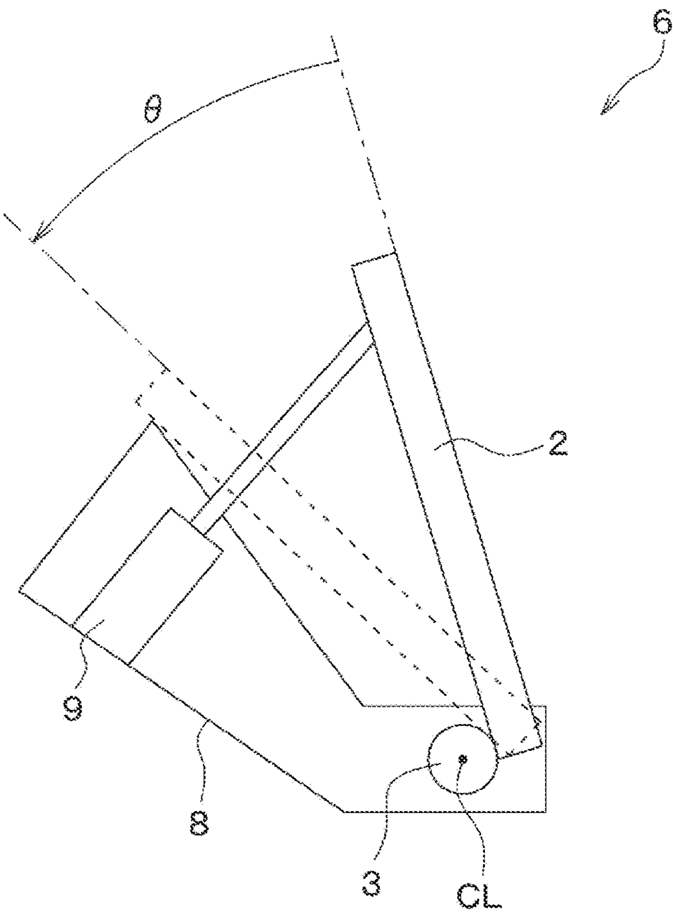
FIG. 2 is a side view of a brake device of the brake system according to the first embodiment.

As shown in FIGS. 1 and 2, the brake device 6 includes a support member 8 installed on the vehicle body, a brake pedal 2 rotatably provided on the support member 8, and a sensor 3 that outputs a signal in accordance with a stroke amount θ of the brake pedal 2. In the following description, the stroke amount θ of the brake pedal 2 may be referred to as the pedal stroke amount.

The support member 8 is attached to a part of the vehicle body on the front side of the cabin interior. Specifically, the support member 8 is attached to, for example, a floor or a dash panel in the interior of the vehicle. The dash panel is a partition wall that separates the interior of the vehicle from the exterior such as the engine room of the vehicle, and is sometimes called a bulkhead.

One end in a longitudinal direction of the brake pedal 2 is rotatably connected to the support member 8. When a driver's pedaling force is applied to the brake pedal 2, the brake pedal 2 rotates within a predetermined angular range around a rotation axis CL provided on the support member 8. Thus, the brake pedal 2 is operated by the driver's pedaling force.

Although FIG. 1 and FIG. 2 exemplify an organ-type brake device 6, the brake device 6 is not limited to this type, and may be of a pendant type, for example. The organ-type brake device 6 is one in which the part of the brake pedal 2 that is stepped on by the driver is arranged above the rotation axis CL. The pendant-type brake device 6 is one in which the part of the brake pedal 2 that is stepped on by the driver is arranged below the rotation axis CL.

The brake device 6 includes a reaction force generating mechanism 9 that generates a reaction force against the pedaling force applied to the brake pedal 2 by the driver. As the reaction force generating mechanism 9, for example, one or more coil springs, an electric actuator, or a combination thereof can be adopted. The reaction force generating mechanism 9 urges the brake pedal 2 rearward in the vehicle compartment (that is, toward the driver sitting in the driver's seat). Since the brake device 6 includes the reaction force generating mechanism 9, even if a mechanical connection between the brake pedal 2 and the master cylinder 56 is abolished, it is possible to obtain the same reaction force as when the brake pedal 2 and the master cylinder 56 are connected.

The sensor 3 outputs a signal corresponding to the stroke amount θ of the brake pedal 2. As the sensor 3, for example, an angle sensor that outputs a voltage signal corresponding to the rotation angle of the brake pedal 2 may be used. As the angle sensor, for example, a magnetic sensor using a Hall IC or the like, a mechanical sensor, an optical sensor, or the like can be used. In that case, the rotation angle of the brake pedal 2 corresponds to the pedal stroke amount. Alternatively, the sensor 3 is not limited to detecting the rotation angle of the brake pedal 2 as the pedal stroke amount, and may be used to detect the operation amount of the brake pedal 2 or the reaction force generating mechanism 9, for example.

An electric signal output from the sensor 3 is input to the ECU 4. The ECU 4 controls the driving of the brake circuit 5 according to the electric signal output from the sensor 3 of the brake device 6 and the state of the vehicle, and controls the braking force generated by the brake circuit 5. The brake circuit 5 is a mechanism that generates braking force to apply a brake to the vehicle by supplying the hydraulic pressure to the wheel cylinders 15 to 18 provided to the respective wheels 11 to 14.

In the brake system 1 illustrated in FIG. 1, the ECU 4 includes a first ECU 41 and a second ECU 42. Also, the brake circuit 5 includes a first brake circuit 51 and a second brake circuit 52.

An electric signal output from the sensor 3 of the brake device 6 is transmitted to the first ECU 41 and the second ECU 42. The first ECU 41 has a computer, a drive circuit, and the like (not shown). The first ECU 41 supplies electric power to a motor 53 of the first brake circuit 51 and the like so as to drive and control the first brake circuit 51. The second ECU 42 also has a computer and a drive circuit, and the like (not shown). The second 2ECU 42 drives and controls an electromagnetic valve, a motor, and the like (not shown) of the second brake circuit 52.

The first brake circuit 51 has a reservoir 55, a motor 53, a gear mechanism 54, a master cylinder 56 and the like. The reservoir 55 stores brake fluid. The motor 53 drives the gear mechanism 54. The gear mechanism 54 reciprocates a master piston 57 of the master cylinder 56 in an axial direction of the master cylinder 56. Due to movement of the master piston 57, the hydraulic pressure of the brake fluid supplied from the reservoir 55 to the master cylinder 56 is increased, and the hydraulic pressure is supplied from the first brake circuit 51 to the second brake circuit 52.

The second brake circuit 52 is a circuit for executing a normal control, an ABS control, a VSC control, etc. by controlling the hydraulic pressure supplied to each wheel cylinder 15 to 18 according to the control signal from the second ECU 42. ABS stands for Anti-lock Braking System, and VSC stands for Vehicle Stability Control. The wheel cylinders 15 to 18 arranged on the respective wheels 11 to 14 drive the brake pads provided on the respective wheels 11 to 14.

The user interface 7 is a device that enables the driver to give various instructions to the brake system 1. The user interface 7 may be, for example, a vehicle-mounted switch, a touch panel, or the like, or may use a communication device such as a mobile device. Information operated by the driver via the user interface 7 is transmitted to the first ECU 41 and the second ECU 42.

The user interface 7 of the present embodiment is configured so that the driver can instruct the ECU 4 of the brake system 1 to select between a first mode and a second mode. Details of the first mode and the second mode will be described later.

Next, an operation of the brake system 1 will be described.

When the driver of the vehicle applies the pedaling force to the brake pedal 2 and operates the brake pedal 2, a signal corresponding to the pedal stroke amount is output from the sensor 3 to the first ECU 41 and the second ECU 42.

The first ECU 41 drives the motor 53 to decelerate the vehicle. As a result, when the rotation speed of the motor 53 increases, the master cylinder 56 increases the resultant hydraulic pressure of the brake fluid supplied from the reservoir 55. The resultant hydraulic pressure of the brake fluid is transmitted from the first brake circuit 51 to the second brake circuit 52.

The second ECU 42 executes the normal control, the ABS control, the VSC control, and the like. For example, the second ECU 42 controls the driving of each solenoid valve of the second brake circuit 52 when performing braking with the braking force according to the operation of the brake pedal 2 by the driver. The second ECU 42 causes the hydraulic pressure supplied from the first brake circuit 51 to be supplied to each of the wheel cylinders 15 to 18 via the second brake circuit 52. Therefore, the brake pads driven by the respective wheel cylinders 15 to 18 each come into frictional contact with the corresponding brake disc. Thus, a brake is applied to each of the wheels 11 to 14, whereby the vehicle decelerates.

Further, for example, the second ECU 42 calculates a slip ratio of each wheel 11 to 14 based on each wheel speed and vehicle speed of the vehicle, and executes the ABS control. Also, for example, the second ECU 42 calculates a sideslip state of the vehicle based on a yaw rate, a steering angle, an acceleration, a speed of each wheel, a vehicle speed, and the like, and executes the VSC control. The second ECU 42 may execute a collision avoidance control, a regenerative cooperative control, and the like based on signals from other ECUs 4 (not shown).

Furthermore, in the present embodiment, as described above, the driver can use the user interface 7 to instruct the brake system 1 to select between the first mode and the second mode. The signal from the user interface 7 is transmitted to the first ECU 41 and the second ECU 42. The first ECU 41 and the second ECU 42 control each part of the brake system 1 based on the signal. The control can be executed by either one or both of the first ECU41 and the second ECU42. Therefore, in the following description, the first ECU41 and the second ECU42 are simply referred to as the ECU4.

Figure 3:
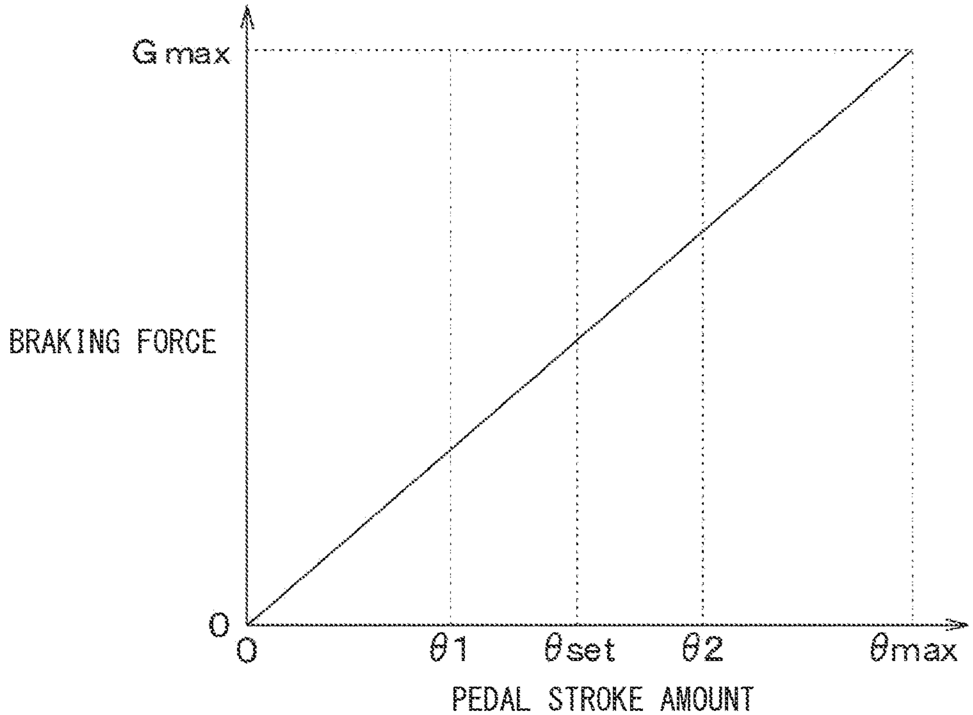
FIG. 3 is a graph showing a relationship between a pedal stroke amount and a braking force when a first mode is selected.

FIG. 3 is a graph showing an example of a "basic characteristic", which is a basic relationship between the stroke amount θ of the brake pedal 2 (that is, the pedal stroke amount) and the braking force generated by the brake circuit 5. In FIG. 3, the horizontal axis represents the pedal stroke amount, and the vertical axis represents the braking force. In FIG. 3, the pedal stroke amount of 0 indicates a state in which the driver's pedaling force is not applied to the brake pedal 2, and the braking force at this time is zero. On the other hand, the pedal stroke amount of θmax indicates a state in which the brake pedal 2 is moved to the maximum rotation position θmax by applying the driver's pedaling force to the brake pedal 2. The braking force at this time is the maximum braking force Gmax that the vehicle in which the braking system 1 is mounted can perform.

When the driver operates the user interface 7 to select the first mode, the ECU 4 executes the normal control in the range of the pedal stroke amount from 0 to θmax. When executing the normal control, the ECU 4 controls the braking force generated by the brake circuit 5 based on the basic characteristics illustrated in FIG. 3. That is, the ECU 4 increases the braking force as the pedal stroke amount increases, and reduces the braking force as the pedal stroke amount decreases. In the ECU 4, the braking force when the brake pedal 2 is moved to the maximum rotation position θmax is assumed to be Gmax.

Figure 4:
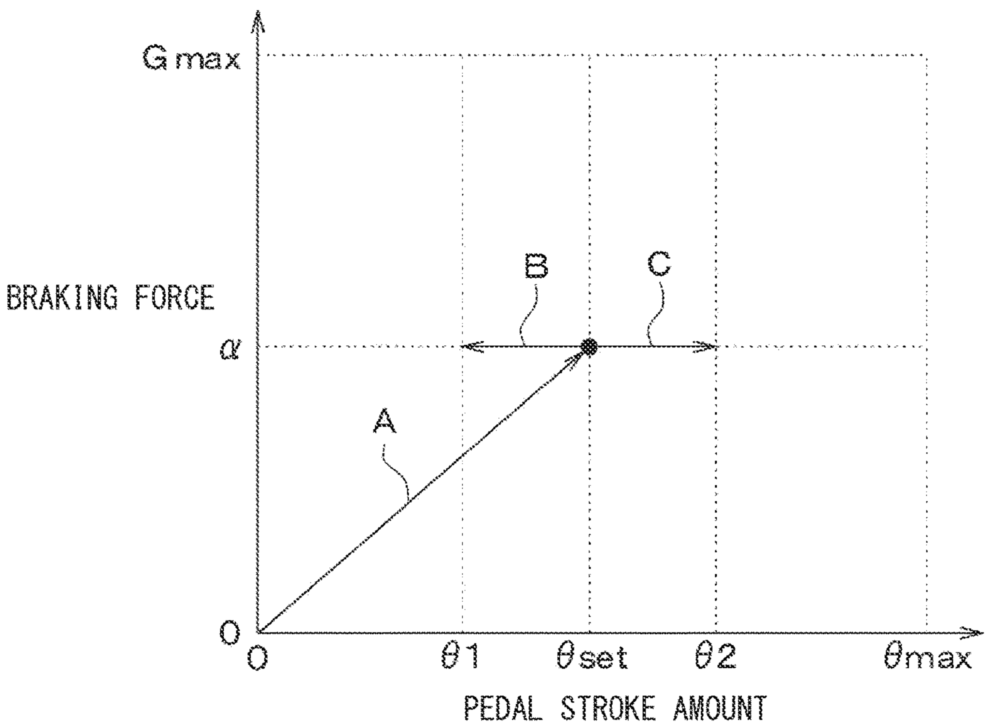
FIG. 4 is a graph showing a relationship between the pedal stroke amount and the braking force when the pedal stroke amount reaches a predetermined set value and the braking force automatic control is executed when the second mode is selected.
Figure 5:
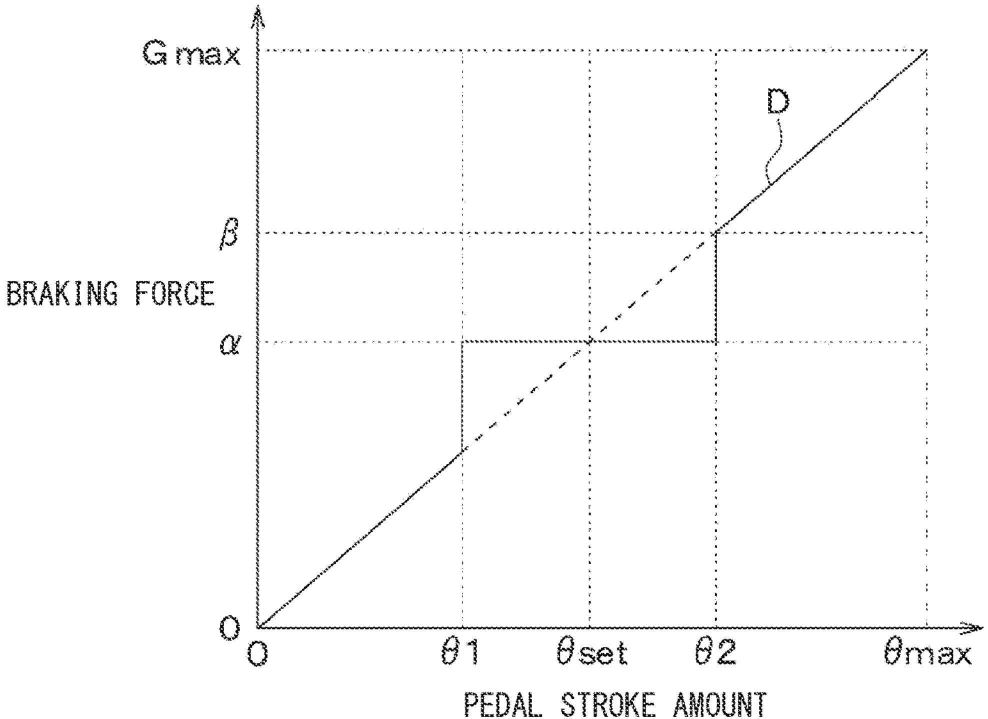
FIG. 5 is a graph showing a relationship between the pedal stroke amount and the braking force after the automatic braking force control is executed when the second mode is selected.
Figure 6:
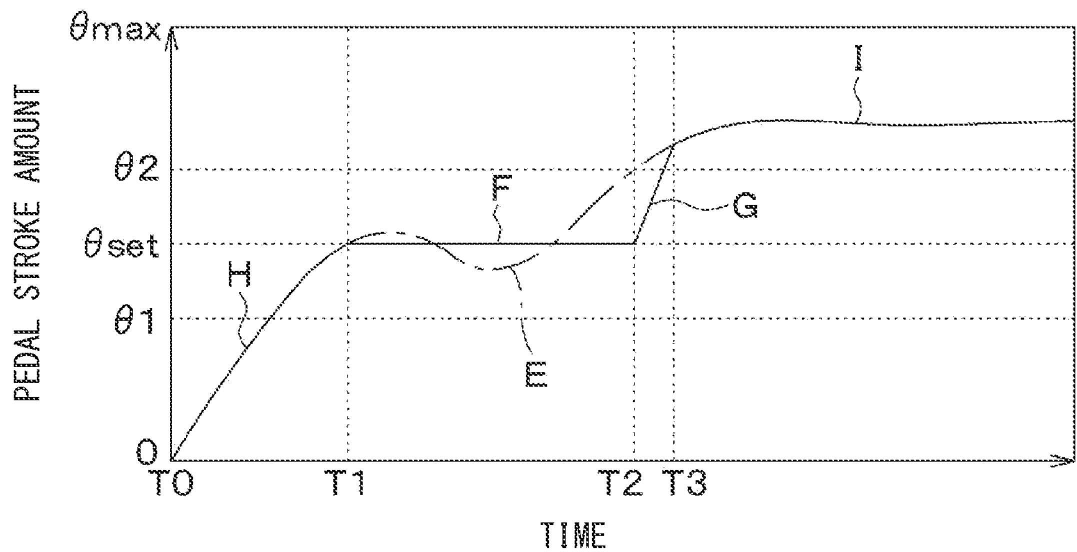
FIG. 6 is a graph showing a relationship between the actual pedal stroke amount and the corrected pedal stroke amount over time when the second mode is selected.

FIGS. 4 to 6 show an example of control executed by the ECU 4 when the second mode is selected by operating the user interface 7 by the driver.

As indicated by an arrow A in the graph of FIG. 4, until the pedal stroke amount is greater than 0 and before reaching a predetermined set value θset, the ECU 4 controls the braking force generated by the brake circuit 5 based on the basic characteristics as in the first mode. That is, the ECU 4 executes the normal control until the pedal stroke amount reaches the set value θset from 0, increases the braking force as the pedal stroke amount increases, and decreases the braking force as the pedal stroke amount decreases. Thus, while the vehicle is traveling, the driver can operate the brake pedal 2 with a relatively small pedaling force to decelerate the vehicle and adjust the speed of the vehicle. The arrow A in the graph of FIG. 4 indicates an increase in the pedal stroke amount. The ECU 4 executes normal control based on the basic characteristics in increasing and decreasing the pedal stroke amount from 0 until the pedal stroke amount reaches the set value θset.

When the pedal stroke amount increases and reaches the set value θset, and thereafter the pedal stroke amount is between the first threshold value θ1 and the second threshold value θ2, the ECU 4 executes an automatic braking force control, as indicated by arrows B and C in the graph of FIG. 4. The automatic braking force control is a control to set the braking force generated by the brake circuit 5 to a predetermined braking force. The first threshold value θ1 is set to a value smaller than the set value θset, and the second threshold value θ2 is set to a value greater than the set value θset.

In the present embodiment, as an example of the automatic braking force control, the ECU 4 executes "constant braking force control" to keep the braking force constant at a predetermined value α when the pedal stroke amount is between the first threshold value θ1 and the second threshold value θ2. For example, in the constant braking force control, the ECU 4 calculates a corrected pedal stroke amount for use in control based on the actual pedal stroke amount (hereinafter referred to as "actual pedal stroke amount" as appropriate) when the driver operates the brake pedal 2. Then, the ECU 4 determines the braking force corresponding to the corrected pedal stroke amount. Specifically, when the actual pedal stroke amount is between the first threshold value θ1 and the second threshold value θ2, the ECU 4 generates the corrected pedal stroke amount with a constant value, and sets the braking force during that period to a constant value α. As a result, even if the actual pedal stroke amount fluctuates due to variations in the pedaling force applied to the brake pedal 2 by the driver during braking of the vehicle, when the actual pedal stroke amount is within the range between the first threshold value θ1 and the second threshold value θ2, the vehicle is braked with a predetermined braking force α. Therefore, the driver can achieve smooth braking through a simple brake pedal operation, instead of detailed adjustment on the brake pedal 2. The predetermined value α of the constant braking force may be set and stored in the ECU 4 in advance, or may be set by the ECU 4 to be an appropriate value based on the vehicle speed, the magnitude of deceleration, and the like.

Furthermore, as shown by a solid line D in FIG. 5, when the pedal stroke amount becomes larger than the second threshold value θ2, the ECU 4 controls the braking force generated by the brake circuit 5 based on the basic characteristics as in the first mode. That is, when the pedal stroke amount becomes larger than the second threshold value θ2, the ECU 4 cancels the constant braking force control and executes the normal control. The ECU 4 increases the braking force according to the increase in the pedal stroke amount, and decreases the braking force according to the decrease in the pedal stroke amount. Thus, when the pedal stroke amount is larger than the second threshold value θ2, the ECU 4 executes the normal control based on the basic characteristics, so the braking force when the brake pedal 2 is at the maximum rotation position θmax becomes Gmax. As a result, at the time of vehicle braking, the driver can stop the vehicle at any stopping position, by increasing the pedaling force applied to the brake pedal 2 to increase the pedal stroke amount over the second threshold value θ2. In addition, also under a situation requiring a sudden stop or a sudden deceleration such as sudden jumping out or another vehicle cutting in while the vehicle is traveling or a brake is being applied to the vehicle, the driver can suddenly stop or suddenly decelerate the vehicle by increasing the pedal stroke amount over the second threshold value θ2.

Furthermore, in the present embodiment, the maximum braking force Gmax is achieved when the pedal stroke is at the maximum rotation position θmax without deteriorating the comfort of pedaling on the brake pedal 2 when the pedal stroke is between the second threshold value θ2 and the maximum rotation position θmax. Therefore, this brake system 1 can enhance the driver's sense of security and improve reliability and safety.

By the way, when the pedal stroke amount exceeds the second threshold value θ2, if the braking force suddenly changes from the predetermined value α to the value β corresponding to the second threshold value θ2, the passengers including the driver may feel uncomfortable. Therefore, immediately after the pedal stroke amount exceeds the second threshold value θ2, it is preferable to increase the braking force at a predetermined increase rate. Then, when the braking force increasing at the predetermined increase rate matches the braking force calculated based on the actual pedal stroke amount, the subsequent braking force is shifted to the braking force calculated based on the actual pedal stroke amount. An example of a specific control method at this time will be described with reference to FIG. 6.

FIG. 6 shows a relationship between a time elapsed after the driver starts operating the brake pedal 2 and the actual pedal stroke amount and the corrected pedal stroke amount when the second mode is selected. In FIG. 6, as indicated by solid lines H and I, the actual pedal stroke amount and the corrected pedal stroke amount match from time T0 to time T1 and after time T3. On the other hand, between time T1 and time T3, the actual pedal stroke amount is indicated by a one-dot chain line E, and the corrected pedal stroke amount during that period is indicated by the solid lines F and G.

As indicated by the solid line H, the driver starts to apply the pedaling force to the brake pedal 2 after time TO. Since the ECU 4 executes the normal control from time T0 to time T1, the actual pedal stroke amount of the brake pedal 2 operated by the driver and the corrected pedal stroke amount generated by the ECU 4 are the same. Therefore, from time T0 to time T1, the braking force increases as the actual pedal stroke increases.

At time T1, the actual pedal stroke amount reaches the set value θset. After that, as indicated by the dashed line E, from time T1 to time T2, the actual pedal stroke amount is between the first threshold value θ1 and the second threshold value θ2. Therefore, as indicated by the solid line F, the ECU 4 starts the constant braking force control at time T1, and thereafter generates the corrected pedal stroke amount at the constant value θset from time T1 to time T2. Therefore, from time T1 to time T2, the braking force is kept at the constant value α based on the corrected pedal stroke amount.

As indicated by the dashed-dotted line E, when the actual pedal stroke amount becomes larger than the second threshold value θ2 at time T2, the ECU 4 cancels the constant braking force control and shifts to the normal control. At this time, as indicated by the solid line G, the ECU 4 increases the corrected pedal stroke amount at a predetermined increase rate after time T2. The increase rate per unit time of the corrected pedal stroke amount at this time is set in advance by experiment or the like and stored in the ECU 4.

When the corrected pedal stroke amount and the actual pedal stroke amount match at time T3, the ECU 4 thereafter sets the actual pedal stroke amount and the corrected pedal stroke amount to the same value as indicated by the solid line I. Therefore, after time T3, the braking force is set according to the actual pedal stroke amount.

Thus, in the present embodiment, after the pedal stroke amount exceeds the second threshold value θ2, a transition period is provided for transitioning from the constant braking force control to the normal control, and the braking force continuously changes from the predetermined value α to a value corresponding to the actual pedal stroke. It is possible to prevent the passengers including the driver from feeling uncomfortable.

Next, a control processing executed by the ECU 4 of the present embodiment when the second mode is selected will be described with reference to the flowchart of FIG. 7.

Figure 7:
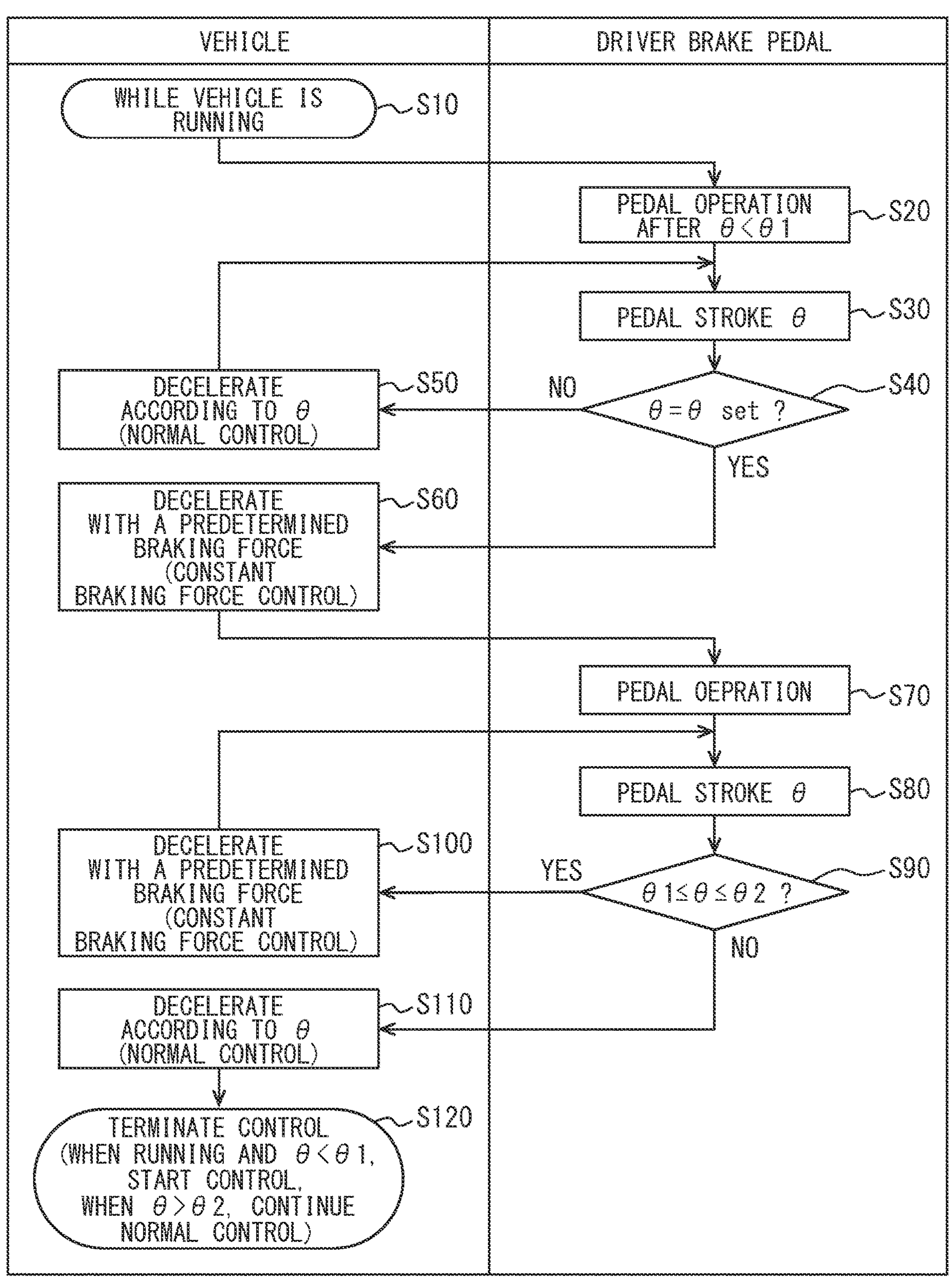
FIG. 7 is a flowchart for explaining control processing executed by an ECU when the second mode is selected.

In step S10 of FIG. 7, the ECU 4 executes this control processing while the vehicle is running.

In step S20, the driver applies the pedaling force to the brake pedal 2 and starts depressing the brake pedal 2 in order to decelerate or stop the vehicle. The pedal stroke amount θ when the brake pedal 2 is started to be depressed is smaller than the first threshold value θ1. The sensor 3 of the brake device 6 outputs a signal corresponding to the pedal stroke amount θ to the ECU 4.

In step S30, the ECU 4 detects the pedal stroke amount θ from the output signal of the sensor 3.

In step S40, the ECU 4 determines whether or not the pedal stroke amount θ has reached the set value θset. When the ECU 4 determines that the pedal stroke amount θ has not reached the set value θset (that is, determination NO in step S40), the process proceeds to step S50.

In step S50, the ECU 4 executes the normal control. In the normal control, the ECU 4 decelerates the vehicle with a braking force corresponding to the pedal stroke amount θ. Then, the ECU 4 returns the process to step S30.

On the other hand, in step 40, when the ECU 4 determines that the pedal stroke amount θ has reached the set value θset (i.e., determination YES in step S40), the process proceeds to step S60.

In step S60, the ECU 4 executes the automatic braking force control to set the braking force to a predetermined braking force. In the present embodiment, the ECU 4 executes the constant braking force control to keep the braking force constant as an example of the automatic braking force control. Then, the ECU 4 advances the process to step S70.

In step S70, the driver continues to depress the brake pedal 2 in order to decelerate or stop the vehicle.

In step S80, the ECU 4 detects the pedal stroke amount θ from the output signal of the sensor 3.

In step S90, the ECU 4 determines whether or not the pedal stroke amount θ is between the first threshold value θ1 and the second threshold value θ2. When the ECU 4 determines that the pedal stroke amount θ is between the first threshold value θ1 and the second threshold value θ2 (that is, determination YES in step S90), the process proceeds to step S100.

In step S100, the ECU 4 continues the automatic braking force control. In the present embodiment, the ECU 4 continuously executes the constant braking force control as an example of the automatic braking force control. Then, the ECU 4 returns the process to step S80.

On the other hand, when the ECU 4 determines in the process of step S90 that the pedal stroke amount θ is not between the first threshold value θ1 and the second threshold value θ2 (that is, determination NO in step S90), the process proceeds to step S110.

In step S110, the ECU 4 cancels the automatic braking force control and executes the normal control. In the normal control, the ECU 4 decelerates the vehicle with a braking force corresponding to the pedal stroke amount θ.

Then, in step S120, the ECU 4 temporarily terminates the control processing when the vehicle stops running. However, when the vehicle is running and the pedal stroke amount θ is smaller than the first threshold value θ1, the ECU 4 returns the process to step S20. On the other hand, when the vehicle is running and the pedal stroke amount θ is larger than the second threshold value θ2, the ECU 4 continues and executes the normal control of step S110.

Here, in order to compare with the brake system 1 of the first embodiment described above, brake systems of first and second comparative examples will be described with reference to FIGS. 18 and 19. The braking systems of the first comparative example and the second comparative example were created by the applicant of the present disclosure, and are not prior art.

Figure 18:
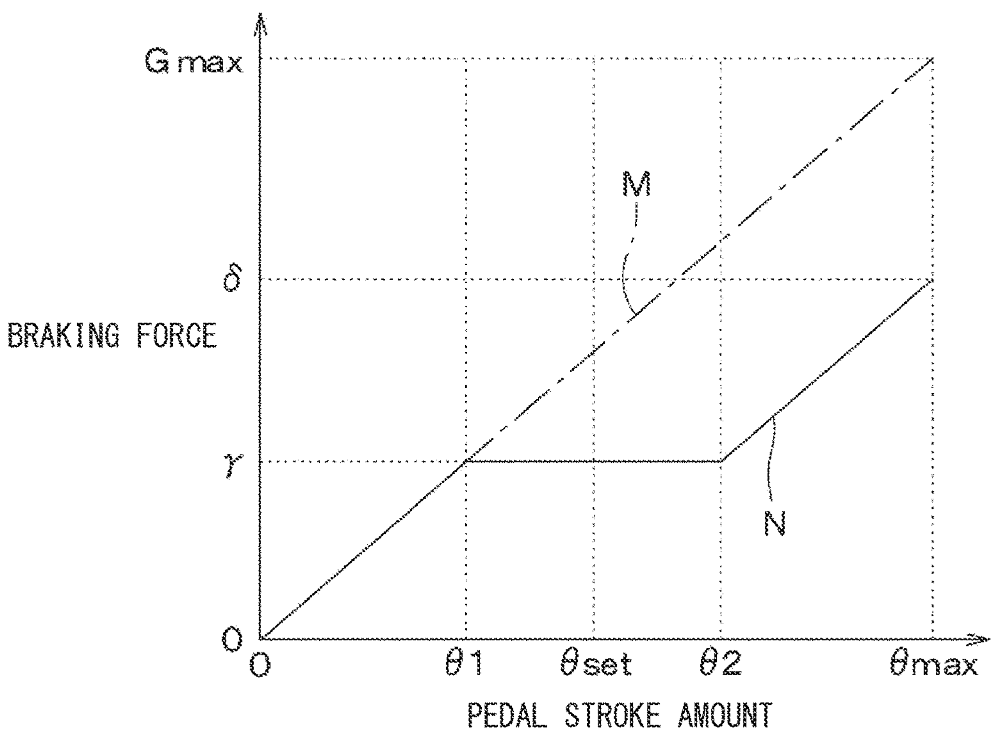
FIG. 18 is a graph showing a relationship between pedal stroke amount and braking force in the brake system of a first comparative example.

FIG. 18 shows the relationship between the pedal stroke amount and the braking force in the first comparative example. Also in the first comparative example, the driver can operate the user interface 7 to select between the first mode and the second mode. A dashed line M in FIG. 18 indicates the relationship between the pedal stroke amount and the braking force when the first mode is selected, and a solid line N indicates the relationship between the pedal stroke amount and the braking force when the second mode is selected. However, the dashed line M and the solid line N overlap when the pedal stroke amount is between 0 to θ1.

As indicated by the dashed line M, the ECU 4 executes the normal control when the first mode is selected. In the normal control, when the pedal stroke amount is between 0 and θmax, the ECU 4 controls the braking force generated by the brake circuit 5 based on the basic characteristics, which are the basic relationship between the stroke amount and the braking force. In this case, the braking force when the brake pedal 2 is moved to the maximum rotation position θmax is the maximum braking force Gmax that can be performed by the vehicle equipped with the brake system 1.

On the other hand, as indicated by the solid line N, when the second mode is selected, the ECU 4 executes the normal control in the range of the pedal stroke amount from 0 to the first threshold value θ1. After the pedal stroke amount reaches the first threshold value θ1, the ECU 4 executes the constant braking force control to set the braking force to a predetermined constant braking force γ, when the pedal stroke amount is between the first threshold value θ1 and the second threshold value θ2. Then, when the pedal stroke amount becomes greater than the second threshold value θ2, the ECU 4 cancels the constant braking force control and executes control for increasing or decreasing the braking force in accordance with the increase or decrease in the pedal stroke amount.

However, in the first comparative example, when the pedal stroke amount increases across the second threshold value θ2, the braking force is set to increase starting from the braking force γ determined by the constant braking force control. Therefore, in the first comparative example, when the second mode is selected, the braking force δ when the brake pedal 2 is moved to the maximum rotation position θmax becomes a value smaller than the maximum braking force Gmax that the vehicle can perform.

Figure 19:
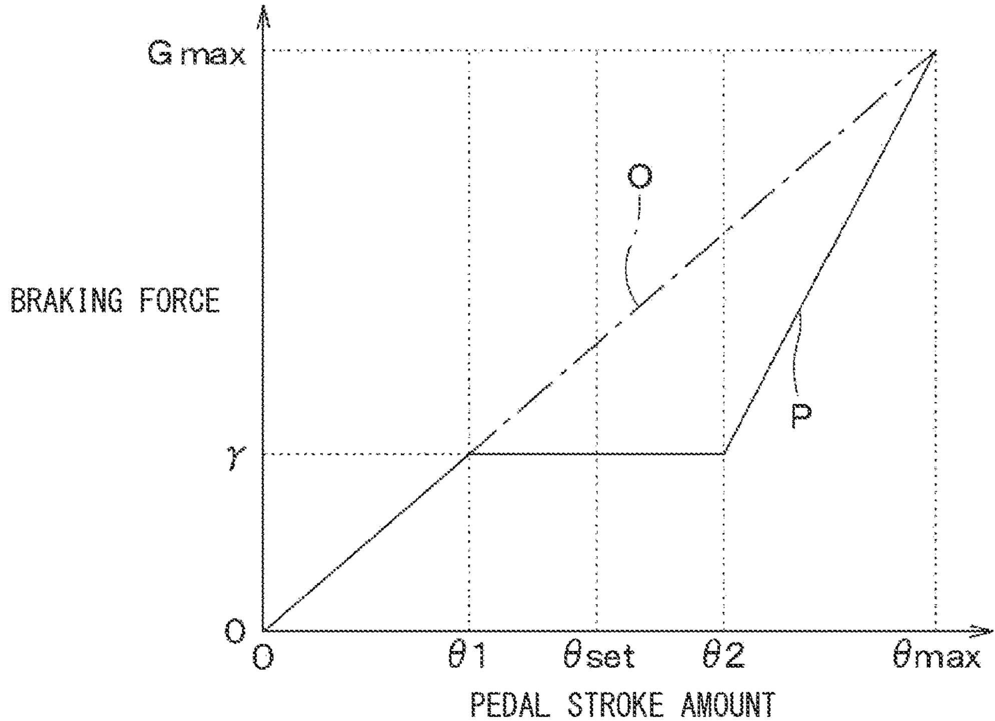
FIG. 19 is a graph showing a relationship between pedal stroke amount and braking force in the brake system of a second comparative example.

Next, FIG. 19 shows the relationship between the pedal stroke amount and the braking force in the second comparative example. Also in the second comparative example, the driver can operate the user interface 7 to select between the first mode and the second mode. A dashed line O in FIG. 19 indicates the relationship between the pedal stroke amount and the braking force when the first mode is selected, and a solid line P indicates the relationship between the pedal stroke amount and the braking force when the second mode is selected. However, the dashed line O and the solid line P overlap when the pedal stroke amount is between 0 to θ1.

Also in the second comparative example, as indicated by the dashed line O, when the first mode is selected, the ECU 4 executes the normal control as in the first comparative example. Further, as indicated by the solid line P, when the second mode is selected, the ECU 4 executes the same control as the control described in the first comparative example within the range of the pedal stroke amount from 0 to the second threshold value θ2. Then, when the pedal stroke amount becomes greater than the second threshold value θ2, the ECU 4 cancels the constant braking force control and executes control for increasing or decreasing the braking force in accordance with the increase or decrease in the pedal stroke amount.

However, in the second comparative example, when the pedal stroke amount is between the second threshold value θ2 and the maximum rotation position θmax, the increase rate of the braking force with respect to the increase in the pedal stroke amount is made larger than the increase rate of the braking force in the basic characteristic. Therefore, in the second comparative example, the braking force when the brake pedal 2 is moved to the maximum rotation position θmax is the maximum braking force Gmax that the vehicle can perform. However, if the increase rate of the braking force with respect to the increase in the pedal stroke amount is made larger than the increase rate of the braking force in the basic characteristic as in the second comparative example, there is a possibility that the driver's feeling of depressing the brake pedal 2 will deteriorate.

Compared with the brake systems of the first and second comparative examples, the brake system 1 of the first embodiment described above has the following effects.

(1) In the brake system 1 of the first embodiment, when the driver selects the second mode and the pedal stroke amount reaches the predetermined set value θset, the ECU 4 executes the automatic braking force control to set the braking force generated by the brake circuit 5 to a predetermined braking force. Therefore, when the automatic braking force control is executed, even if the pedal stroke amount fluctuates due to variations in the pedaling force applied to the brake pedal 2 by the driver, if the pedal stroke amount is between the first threshold value θ1 and the second threshold value θ2, a stable braking of the vehicle is achieved. Therefore, the brake system 1 enables stable braking of the vehicle with a simple pedal operation by the driver, and can reduce the driver's stress associated with the operation of the brake pedal 2.

Furthermore, in the first embodiment, when the second mode is selected, the ECU 4 controls the braking force generated by the brake circuit 5 with the braking force based on the basic characteristics when the pedal stroke amount exceeds the second threshold value θ2. Therefore, in this brake system 1, even after the pedal stroke amount exceeds the second threshold value θ2 when the second mode is selected, the feeling of stepping on the brake pedal 2 does not deteriorate, and when the pedal stroke amount is at the maximum rotation position θmax, It is possible to generate the maximum braking force Gmax. Therefore, this brake system 1 can enhance the driver's sense of security and improve reliability and safety.

(2) In the first embodiment, the automatic braking force control executed by the ECU 4 is a constant braking force control that keeps the braking force constant.

According to this configuration, even if the pedaling force applied to the brake pedal 2 by the driver fluctuates to some extent, the deceleration G during braking of the vehicle is kept constant as long as the pedal stroke amount is between the first threshold value θ1 and the second threshold value θ2. Therefore, a smooth braking is realized. Therefore, it is possible to improve the riding comfort during braking of the vehicle.

Second to Tenth Embodiments

Second to tenth embodiments will be described. Also in the second to tenth embodiments, as in the first embodiment, the driver can operate the user interface 7 to select the first mode and the second mode. Also in the second to tenth embodiments, the normal control executed by the ECU 4 when the first mode is selected is the same as the normal control described in the first embodiment. Therefore, in the following description, mainly the control executed by the ECU 4 when the second mode is selected will be described.

Second Embodiment

In the brake system 1 of the second embodiment, a control processing executed by the ECU 4 when the second mode is selected will be described with reference to FIG. 8. The graph in FIG. 8 corresponds to a combination of the graph in FIGS. 4 and the graph in FIG. 5 referred to in the first embodiment.

Figure 8:
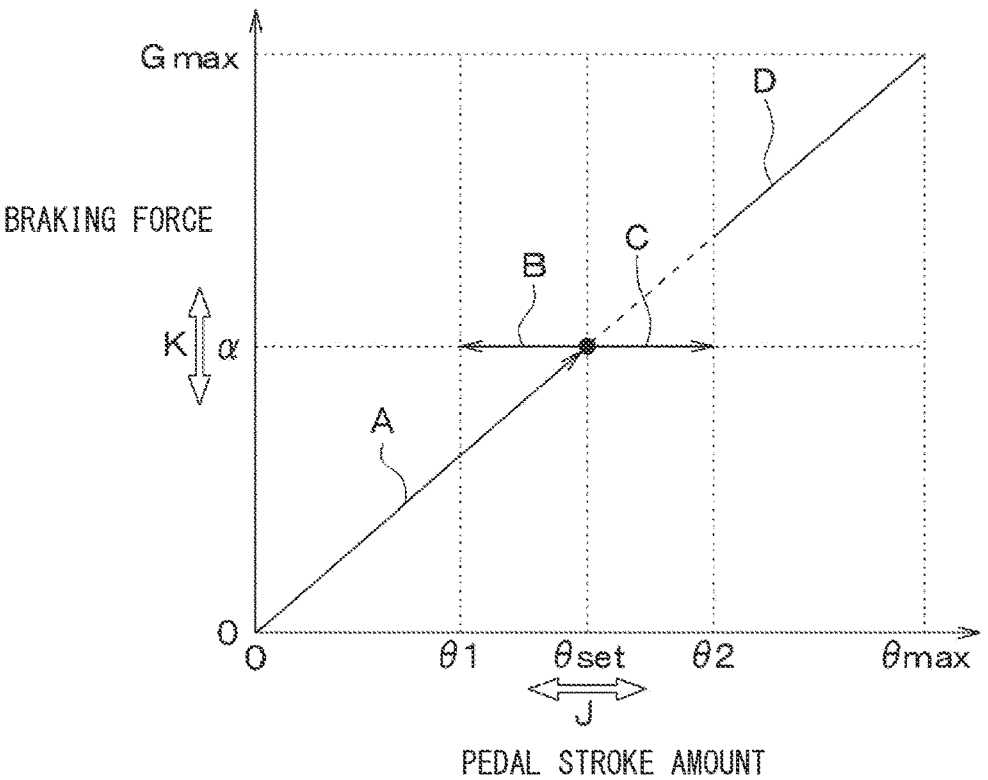
FIG. 8 is a graph showing a relationship between the pedal stroke amount and the braking force in the brake system according to a second embodiment.

As indicated by an arrow A in the graph of FIG. 8, until the pedal stroke amount is greater than 0 and before reaching a predetermined set value θset, the ECU 4 controls the braking force generated by the brake circuit 5 based on the basic characteristics. Then, as indicated by arrows B and C, after the pedal stroke amount reaches the set value θset, when the pedal stroke amount is between the first threshold value θ1 and the second threshold value θ2, the ECU 4 executes the automatic braking force control to set the braking force to a predetermined braking force. Also in the second embodiment, the ECU 4 executes "constant braking force control" to keep the braking force constant at a predetermined value α as an example of automatic braking force control. Furthermore, as indicated by the solid line D, when the pedal stroke amount becomes greater than the second threshold value θ2, the ECU 4 cancels the constant braking force control and executes the normal control. That is, the ECU 4 controls the braking force generated by the brake circuit 5 based on the basic characteristics when the pedal stroke amount is between the second threshold value θ2 and the maximum rotation position θmax. This explanation is the same as the content explained in the first embodiment also in the second embodiment.

Here, in the second embodiment, as indicated by the arrows J and K on the horizontal and vertical axes of FIG. 8, the driver can adjust at least one of the set value θset of the pedal stroke amount at which the constant braking force control is started and the braking force α when the constant braking force control is executed to an arbitrary value. This adjustment can be performed by operating the user interface 7 by the driver. The user interface 7 may be mounted on the vehicle, for example, to enable a continuous value adjustment using a dial or a stepwise value adjustment using an UP/DOWN button. Alternatively, the user interface 7 may utilize a communication equipment such as mobile devices. Information operated by the driver via the user interface 7 is transmitted to the first ECU 4. That is, by operating the user interface 7, the driver can adjust at least one of the set value θset of the pedal stroke amount and the braking force α when the constant braking force control is executed to an arbitrary value continuously or stepwise.

Further, when the vehicle and the ECU 4 are equipped with a system capable of identifying the driver, the value adjusted for each identified driver is recorded in the ECU 4, and at the next and subsequent driving opportunities, the value may be automatically set at the same time as getting in the vehicle. As a system capable of identifying a driver, for example, it is possible to use a driver status monitor or authentication by a mobile device.

In the brake system 1 of the second embodiment described above, the user interface 7 is configured to adjust at least one of the set value θset of the pedal stroke amount and the braking force when the automatic braking force control is executed continuously or stepwise by the operation of the driver. According to this configuration, the driver can operate the user interface 7 to adjust the braking force of the automatic braking force control according to his/her preferred driving style.

Third Embodiment

In the brake system 1 of the third embodiment, the relationship between the control executed by the ECU 4 when the second mode is selected and the pedaling force applied to the brake pedal 2 by the driver will be described with reference to FIG. 9.

Figure 9:
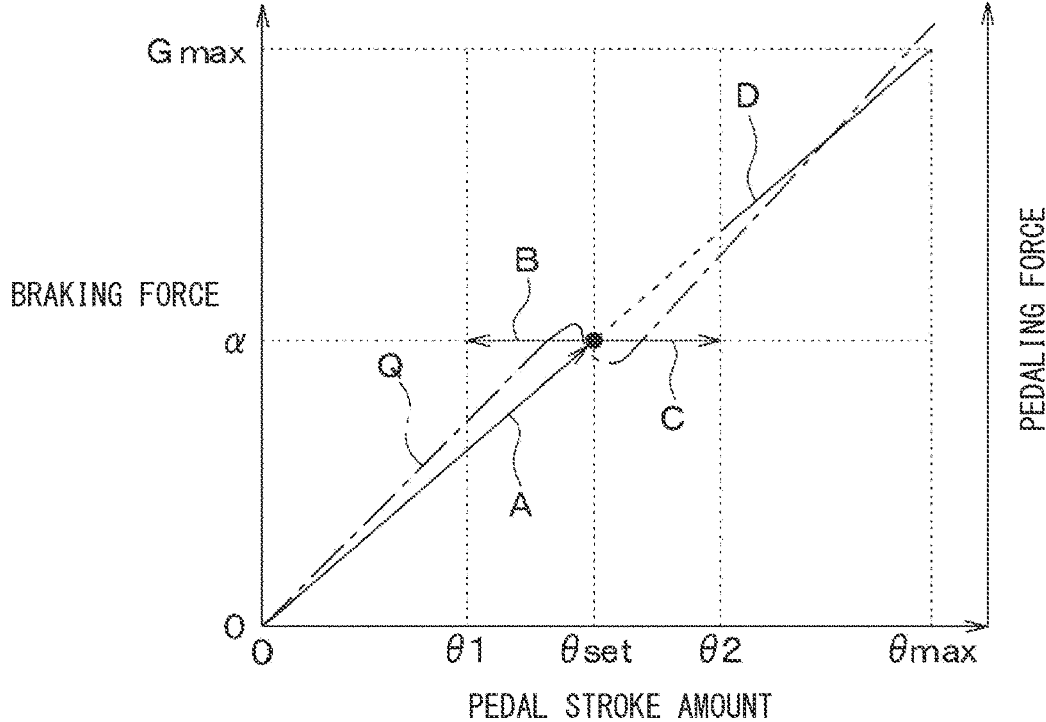
FIG. 9 is a graph showing a relationship between pedal stroke amount, the braking force, and the pedaling force when the second mode is selected in the brake system according to a third embodiment.

As indicated by the arrows A, B, and C and the solid line D in the graph of FIG. 9, even in the third embodiment, the control executed by the ECU 4 when the second mode is selected is the same as that described in the first embodiment.

Here, the third embodiment is an example in which the pedaling force applied to the brake pedal 2 by the driver (that is, the reaction force generated by the reaction force generating mechanism 9) and the pedal stroke amount are interlocked. In the following description, the force applied to the brake pedal 2 by the driver is referred to as "pedaling force". In the graph of FIG. 9, the dashed-dotted line Q indicates the pedaling force with respect to the pedal stroke amount. The brake pedal 2 usually has such a characteristic that the pedaling force applied to the brake pedal 2 by the driver increases as the pedal stroke amount increases. Furthermore, in recent years, a technique has begun to appear in which an actuator is mounted in place of or together with a mechanical or hydraulic reaction force generating mechanism 9 to vary the pedaling force. In the third embodiment, a system is assumed in which the pedaling force can be varied by the actuator. As indicated by the dashed-dotted line Q in the graph of FIG. 9, in the relationship between the pedal stroke amount and the pedaling force, while the pedal stroke is increasing, there is provided a portion where the pedaling force temporarily decreases near the set value θset (hereinafter referred to as a "pedaling force changing portion"). The driver can easily maintain the pedal stroke at the pedal stroke amount (that is, near the set value θset) at which the control is switched from the normal control to the automatic braking force control.

Fourth Embodiment

In the brake system 1 of the fourth embodiment, the relationship between the control executed by the ECU 4 when the second mode is selected and the pedaling force will be described with reference to FIG. 10.

Figure 10:
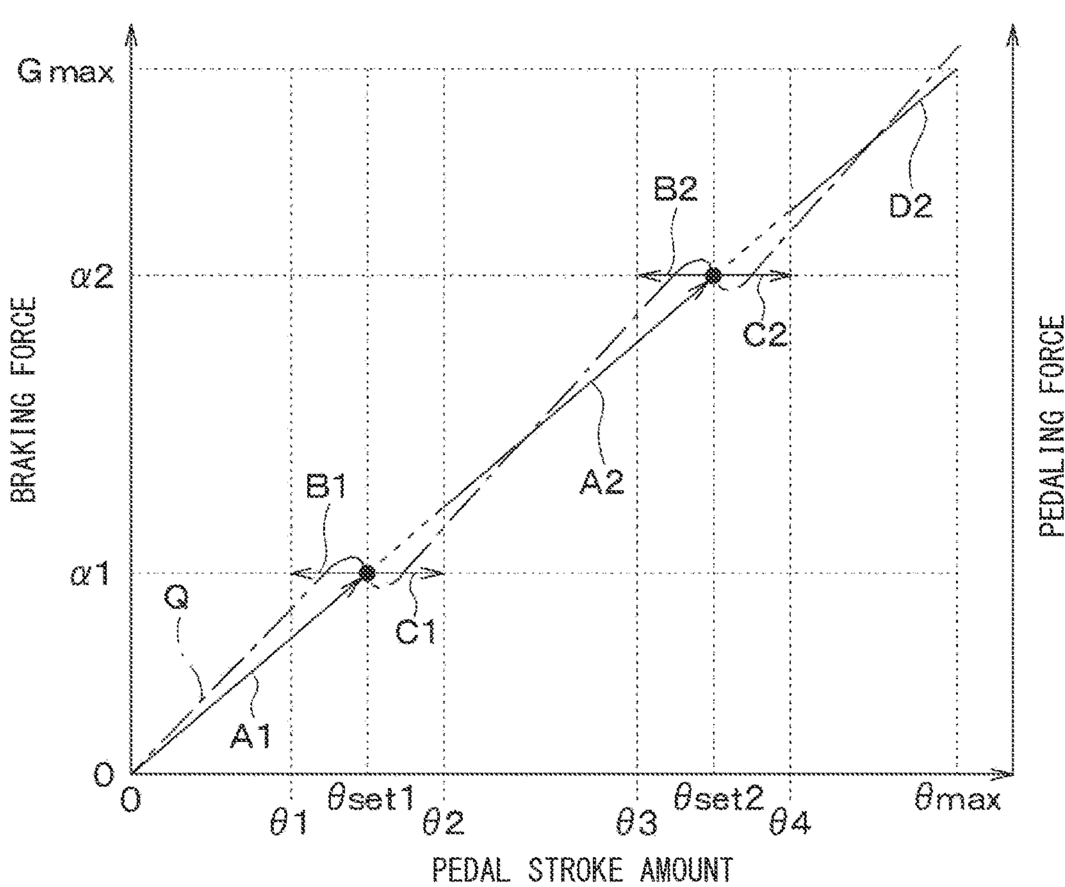
FIG. 10 is a graph showing a relationship between the pedal stroke amount, the braking force, and the pedaling force when the second mode is selected in the brake system according to a fourth embodiment.

As indicated by the arrows A1, B1, C1, A2, B2, and C2 and the solid line D2 in the graph of FIG. 10, in the fourth embodiment, when the second mode is selected, the ECU 4 executes the automatic braking force control (for example, the constant braking force control) at multiple points in the pedal stroke. Specifically, after the pedal stroke amount reaches the first set value θset1, when the pedal stroke amount is between the first threshold value θ1 and the second threshold value θ2, the ECU 4 executes "first automatic braking force control". Further, after the pedal stroke amount increases and reaches the second set value θset2, when the pedal stroke amount is between the third threshold value θ3 and the fourth threshold value θ4, the ECU 4 executes "second automatic braking force control". The braking force by the "first automatic braking force control" is constant at α1, and the braking force by the "second automatic braking force control" is constant at α2.

Here, as indicated by the dashed line Q in the graph of FIG. 10, in the fourth embodiment, a plurality of pedaling force change portions are provided in the middle of the pedal stroke. A plurality of pedaling force change portions are assigned and set to a plurality of set values θset1 and θset2 at which the control is switched from the normal control to the automatic braking force control, respectively. As a result, the driver can intuitively set the automatic braking force control based on the change in the pedaling force.

In the above-described fourth embodiment, the automatic braking force control is set at two points in the middle of the pedal stroke, but the present disclosure is not limited to this configuration, and the automatic braking force control may be executed at three or more points in the middle of the pedal stroke.

Fifth Embodiment

Control executed by the ECU 4 in the brake system 1 of the fifth embodiment will be described with reference to the flowchart of FIG. 11.

Figure 11:
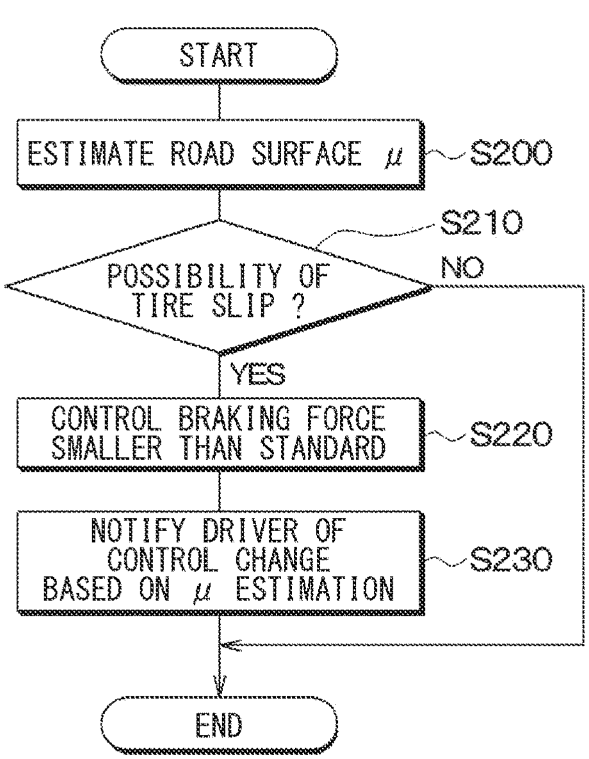
FIG. 11 is a flowchart for explaining control processing executed by an ECU in the brake system according to a fifth embodiment.

The ECU 4 included in the brake system 1 of the fifth embodiment executes the control processing shown in the flowchart of FIG. 11 while the vehicle is running.

In step S200, the ECU 4 estimates a road surface friction coefficient. In addition, ECU4 may measure the road surface friction coefficient directly. In addition, in FIG. 11, the friction coefficient is expressed as μ.

Next, in step S210, the ECU 4 determines that there is a possibility of tire slip when braking is performed with a predetermined braking force α (hereinafter referred to as "standard braking force α" as appropriate) when the constant braking force control is executed.

When the ECU 4 determines in step S210 that there is little or no possibility of tire slip, the process ends.

On the other hand, when the ECU 4 determines in step S210 that the possibility of tire slip is present or high, the process proceeds to step S220.

In step S220, the ECU 4 changes the braking force when the constant braking force control is executed to a braking force c (hereinafter referred to as "anti-slip braking force ε") smaller than the standard braking force α. This process is called a braking force changing process.

Subsequently, in step S230, the ECU 4 notifies the driver that the braking force changing process has been executed by various means such as voice, screen display, or vibration. As a result, the driver can recognize that the standard braking force α executed under the constant braking force control has been automatically switched to the anti-slip braking force ε, so that the driver does not feel uneasy.

In the control processing shown in the flowchart of FIG. 11, when the ECU 4 determines that the possibility of tire slip is present or high, the process of changing the braking force when the constant braking force control is executed is performed. It is not limited to that process. For example, when the ECU 4 determines that the possibility of tire slip is present or high, instead of changing the braking force, the control may be switched from the second mode to the first mode. After switching the control to the first mode, the ECU 4 executes the normal control over the entire pedal stroke amount. Also in this case, the ECU 4 notifies the driver that the control has been switched from the second mode to the first mode by various means such as sound, screen display, or vibration. As a result, the driver can recognize that the control has been automatically switched, so that the driver does not feel uneasy.

In the brake system 1 of the fifth embodiment, the relationship between the control executed by the ECU 4 when the second mode is selected and the pedaling force will be described with reference to FIG. 12.

Figure 12:
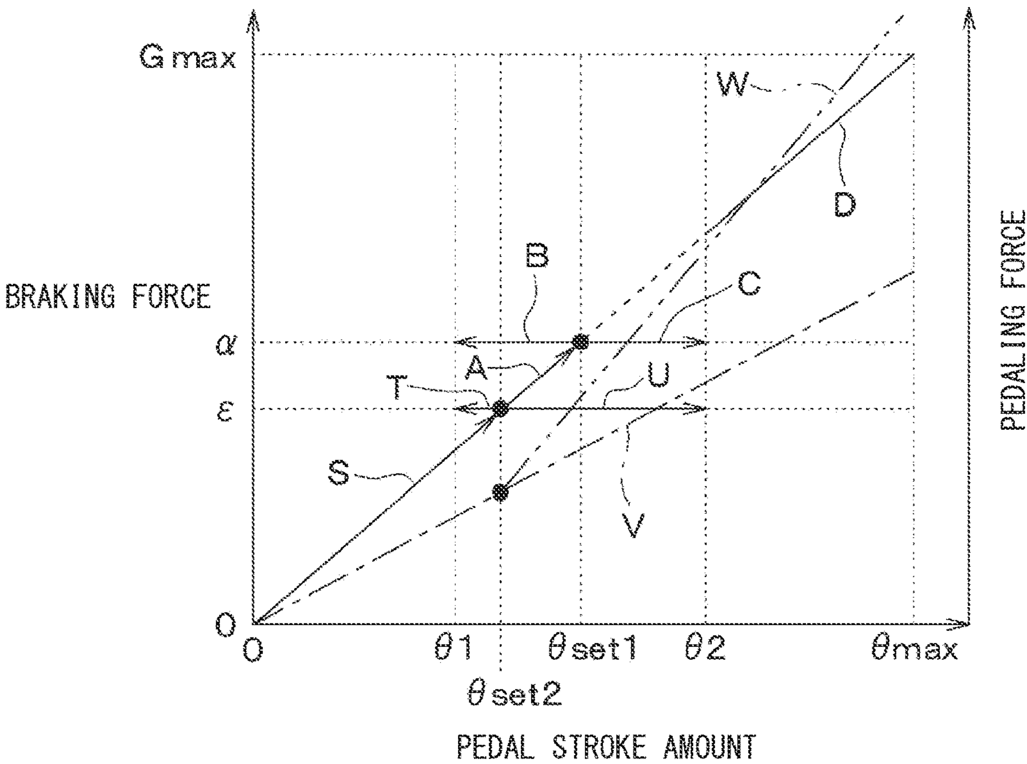
FIG. 12 is a graph showing a relationship between the pedal stroke amount, the braking force, and the pedaling force when the second mode is selected in the brake system according to a fifth embodiment.

As shown in the arrows A, B, and C and the solid line D in the graph of FIG. 12, in the fifth embodiment, the ECU 4 executes the control when it is determined that there is little or no possibility of tire slip based on the tread surface friction coefficient. In this case, the braking force for the automatic braking force control is set to the standard braking force α.

On the other hand, as shown in the arrows S, T, and U, the ECU 4 executes the control when it is determined that a possibility or tire slip is present or high based on the tread surface friction coefficient. In this case, the braking force for the automatic braking force control is set to the anti-slip braking force ε.

Furthermore, the dashed-dotted line V in the graph of FIG. 12 shows the pedaling force with respect to the pedal stroke amount when it is determined that the possibility of tire slip is negligible or low based on the tread surface friction coefficient. against the pedaling force applied to the brake pedal 2 by the driver On the other hand, the chain double-dashed line W in the graph of FIG. 12 shows the pedaling force with respect to the pedal stroke amount when it is determined based on the tread surface friction coefficient that there is or is a high possibility of tire slip. In this case, the ECU 4 interlocks with the braking force changing process for changing the braking force of the automatic braking force control from the standard braking force α to the anti-slip braking force ε, and changes the pedaling force (that is, the reaction force generated by the reaction force generating mechanism 9). Specifically, the ECU 4 increases the reaction force more than usual by the actuator that constitutes the reaction force generating mechanism 9 when the stroke amount is larger than the pedal stroke amount θset2 corresponding to the anti-slip braking force ε. By creating a feeling (a so-called wall feeling) that the pedaling force increases in the driver's pedal operation, it is difficult for the driver to operate the pedal up to a stroke amount that may cause tire slip. As a result, the system can prompt the driver to perform preventive and safe driving operations.

This fifth embodiment shows the control focuses on not causing tire slip in principle, and in a situation where it is determined that tire slip is actually occurring, it is assumed that the ABS control used in conventional vehicles will operate preferentially.

In the fifth embodiment described above, when the ECU 4 provided in the brake system 1 determines that there is a possibility of tire slip based on the information on the directly measured or estimated road surface friction coefficient, the ECU 4 executes at least one of the braking force changing process or a mode changing process. The braking force changing process is a process of setting the braking force at the time of executing the automatic braking force control to a braking force c smaller than a predetermined standard braking force α. The mode changing process is a process of changing the second mode to the first mode. Furthermore, the ECU 4 is configured to notify the driver that the braking force changing process or the mode changing process has been executed.

According to this configuration, the ECU 4 can prevent the tire slip by determining the possibility of tire slip during execution of the automatic braking force control and setting the braking force smaller than the standard braking force α. Further, the ECU 4 notifies the driver that the braking force changing process or the mode changing process has been executed so as not to make the driver uneasy, and can recommend the preventive driving such as keeping a wide distance between vehicles and operating the brake pedal 2 earlier.

Sixth Embodiment

In the brake system 1 of the sixth embodiment, the relationship between the control executed by the ECU 4 when the second mode is selected and the pedaling force will be described with reference to FIG. 13.

Figure 13:
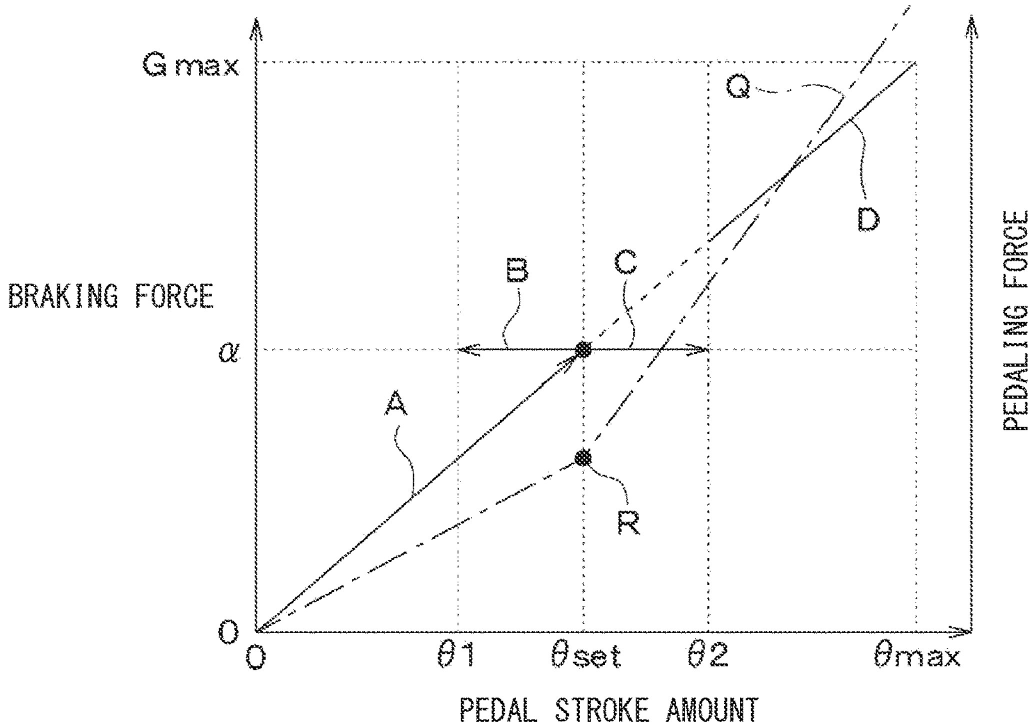
FIG. 13 is a graph showing a relationship between the pedal stroke amount, the braking force, and the pedaling force when the second mode is selected in the brake system according to a sixth embodiment.

As indicated by the arrows A, B, and C and the solid line D in the graph of FIG. 13, even in the sixth embodiment, the control executed by the ECU 4 when the second mode is selected is the same as that described in the first embodiment.

A dashed-dotted line Q in the graph of FIG. 13 indicates the relationship between the pedal stroke amount and the pedaling force (hereinafter, the relationship is referred to as the pedaling force characteristic of the brake pedal 2). As indicated by a point R in the middle of the one-dot chain line Q, an inflection point at which the pedaling force characteristic of the brake pedal 2 changes is provided in the middle of the pedaling force characteristic of the brake pedal 2. In the sixth embodiment, the inflection point at which the pedaling force characteristic of the brake pedal coincides with the set value θset at which the braking control mode is switched. As a result, the driver can intuitively recognize whether or not the braking control has been switched through the feel of his feet, and it leads to a sense of security in operation. The inflection point of the pedaling force characteristic of the brake pedal 2 may be formed by a mechanical spring force generated by the reaction force generating mechanism 9 provided in the brake device 6, or may be formed by an actuator.

In the sixth embodiment described above, the reaction force generating mechanism 9 provided in the brake device 6 has one or more inflection points that change the relationship between the stroke amount and the reaction force. At least one inflection point is set to a pedal stroke amount corresponding to a predetermined set value θset.

According to this configuration, when the pedal stroke amount θ reaches the predetermined set value θset, the reaction force changes due to the inflection point. Therefore, the driver can intuitively recognize that the execution of the automatic braking force control has started by the feeling transmitted from the brake pedal 2 to the driver's foot.

Seventh Embodiment

The seventh embodiment is a modification of the sixth embodiment, and the reaction force generating mechanism 9 with which the brake device 6 is provided is composed of the actuator.

Figure 14:
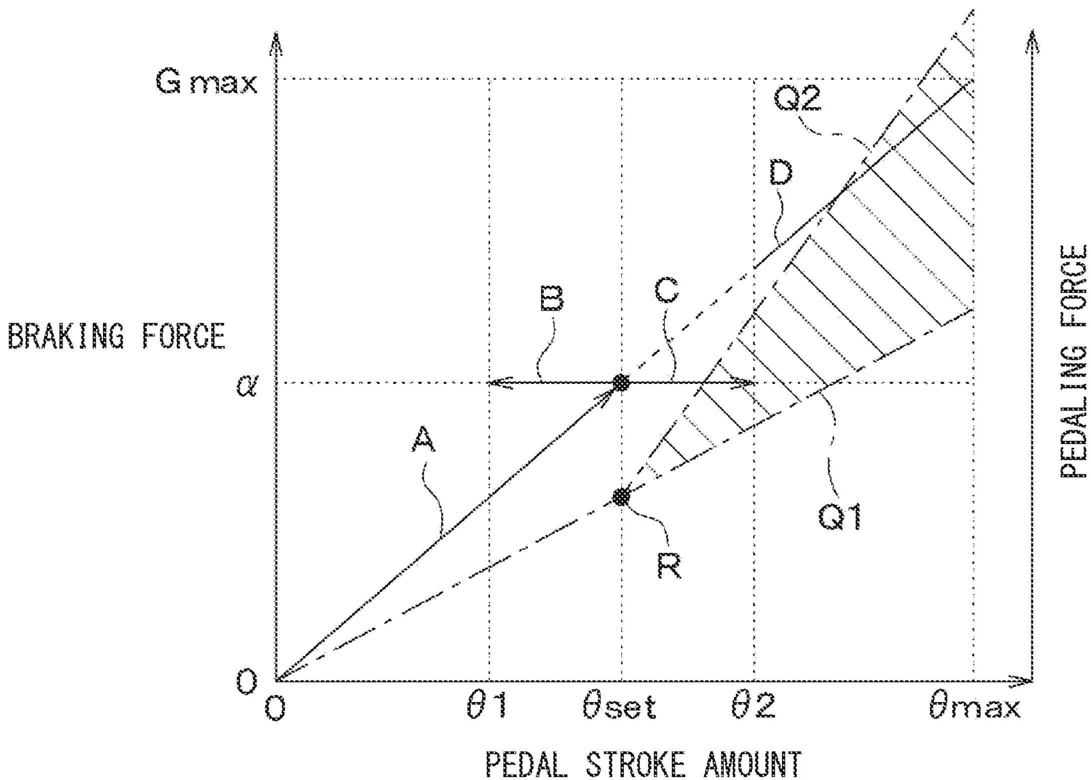
FIG. 14 is a graph showing a relationship between the pedal stroke amount, the braking force, and the pedaling force when the second mode is selected in the brake system according to a seventh embodiment.

As indicated by the dashed-dotted lines Q1 and Q2 and the point R provided at the point of inflection thereof in the graph of FIG. 14, in the seventh embodiment as well, the inflection point at which the pedaling force characteristic of the brake pedal 2 is switched coincides with the set value θset at which the braking control mode is switched. In the seventh embodiment, by configuring the reaction force generating mechanism 9 with the actuator, the pedaling force characteristic can be arbitrarily adjusted as indicated by a hatching between the dashed-dotted lines Q1 and Q2 in the graph of FIG. 14.

Eighth Embodiment

Figure 15A:
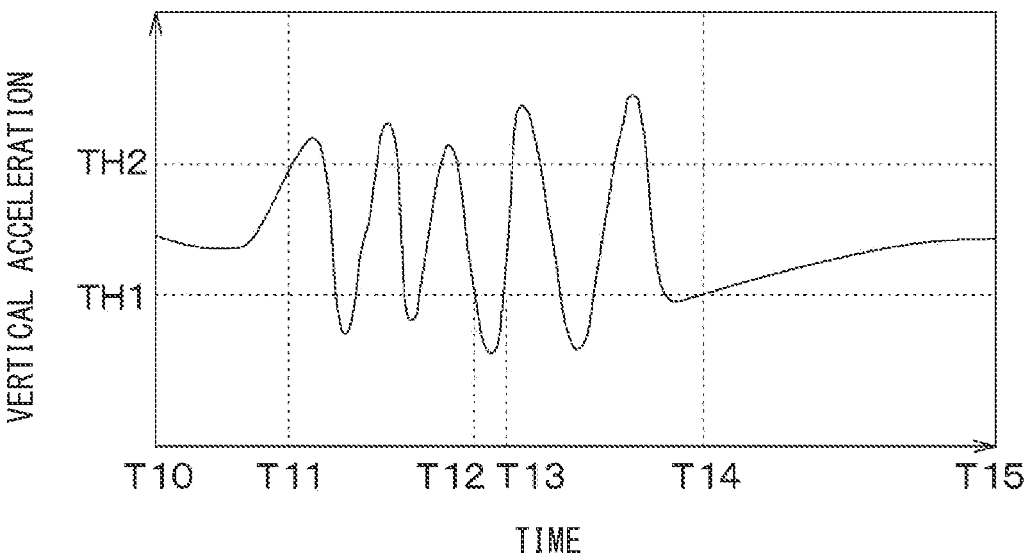
FIG. 15A is a graph showing vertical acceleration acting on the vehicle over time in the brake system according to an eighth embodiment.

The eighth embodiment will be described with reference to FIGS. 15A and 15B. FIG. 15A is a graph showing a vertical acceleration acting on the vehicle over time (hereinafter referred to as "vehicle vertical G") while the constant braking force control is being executed by the ECU 4 provided in the brake system 1.

As shown in FIG. 15A, the vehicle vertical G becomes larger between times T11 to T14. Regarding the vehicle vertical G, for example, the acceleration in the vertical direction may be directly measured by an acceleration sensor mounted on the vehicle, or whether or not the vehicle vertical G is also large may be estimated from the output signal of an acceleration sensor that detects acceleration in a direction other than the vertical direction. Further, the magnitude of the unevenness of the road surface may be determined from the output signal of the axle torque sensor or the tire grip force sensor. The size of road unevenness may be determined based on image recognition by a forward recognition camera. The ECU 4 provided in the brake system 1 determines that the vehicle vertical G is greatly fluctuating, for example, when the value of the vehicle vertical G exceeds a predetermined upper acceleration threshold TH1 and a lower acceleration threshold TH2.

Figure 15B:
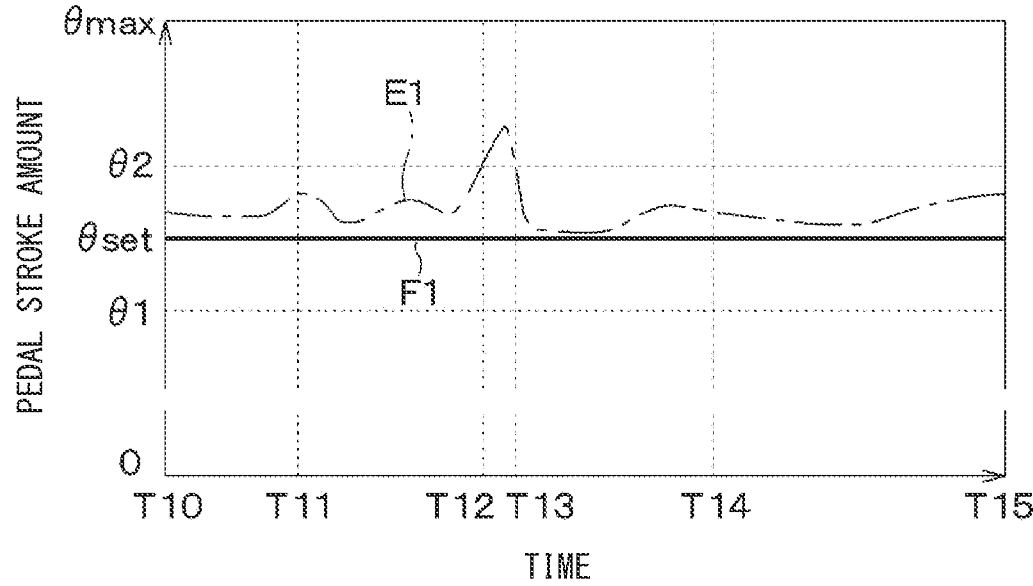
FIG. 15B is a graph showing a relationship between the actual pedal stroke amount and the corrected pedal stroke amount in the same time course as in FIG. 15A.

Next, FIG. 15B is a graph showing a relationship between the actual pedal stroke amount and the corrected pedal stroke amount in the same time course as in FIG. 15A. In FIG. 15B, the actual pedal stroke amount is indicated by a dashed line E1, and the corrected pedal stroke amount is indicated by a solid line F1. As shown in FIG. 15B, the corrected pedal stroke amount is constant during the period from time T10 to time T15 because the constant braking force control is executed by the ECU 4. Here, in FIG. 15B, the actual pedal stroke amount indicated by the one-dot chain line E1 exceeds the second threshold value θ2 between times T12 and T13, and falls below the second threshold value θ2 at times before and after. In the present embodiment, when a time zone in which the vehicle vertical G changes more than the vertical acceleration threshold values TH1 and TH2 and a time zone in which the actual pedal stroke amount deviates from the region between the first threshold value θ1 and the second threshold value θ2 overlap at least partially, the ECU 4 maintains the automatic braking force control. Therefore, the ECU 4 continues to execute the constant braking force control even during the time T12 to T13, and keeps the corrected pedal stroke amount shown by the solid line F1 constant.

In a driving scene where the vehicle vertical G fluctuates greatly, the driver himself/herself is also swayed up and down from the seat, causing unintended fluctuations in the pedal stroke amount, and as a result, it is conceivable that the pedal stroke amount exceeds the second threshold value θ2. In a case where the pedal stroke amount θ exceeds the second threshold value θ2 only at one point in the calculation period and is less than θ2 at times before and after, when the vehicle vertical G is large at the same timing, the ECU 4 determines that it is an operation not intended by the driver, that is, noise. Then, the ECU 4 continues the braking force control without switching the mode. It is possible to suppress a change in the braking force that is not the driver's intentional operation, so that the driver does not feel uncomfortable.

In the eighth embodiment described above, when a time zone in which the vehicle vertical G changes more than a predetermined vertical acceleration threshold values and a time zone in which the pedal stroke amount deviates from the region between the first threshold value θ1 and the second threshold value θ2 overlap at least partially, the ECU 4 maintains the automatic braking force control.

According to this configuration, when the pedal stroke amount deviates from the range between the first threshold value θ1 and the second threshold value θ2 while the vehicle is traveling on an uneven road, the ECU 4 determines that the operation is not intentional by the driver. and maintain the automatic braking force control. As a result, it is possible to prevent the driver from feeling uncomfortable due to an unintended change in the braking force.

Ninth Embodiment

Figure 16:
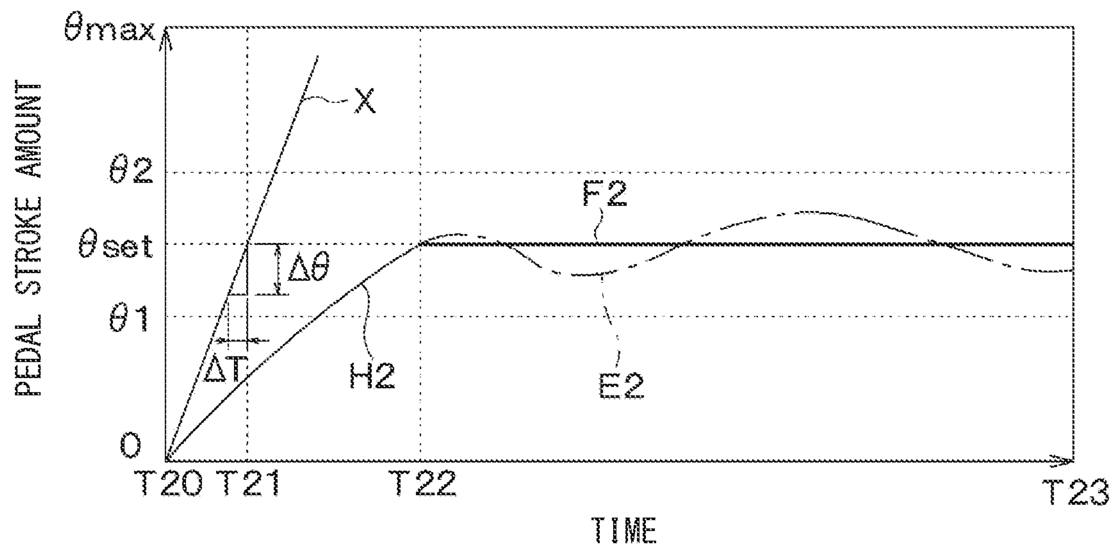
FIG. 16 is a graph showing a relationship between the actual pedal stroke amount and the corrected pedal stroke amount over time when the second mode is selected in the brake system according to a ninth embodiment.
Figure 17:
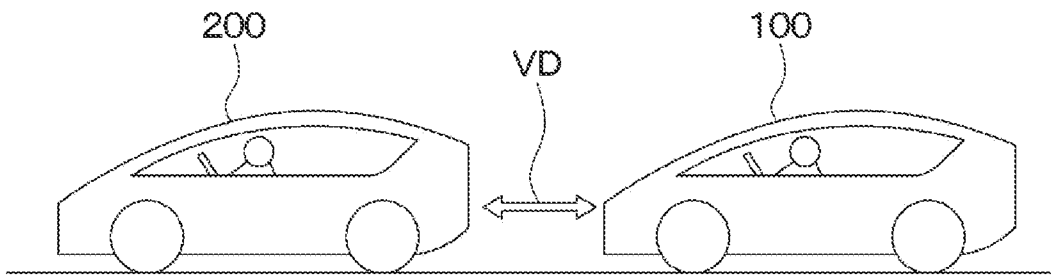
FIG. 17 is a diagram showing a positional relationship between the own vehicle equipped with the brake system according to the ninth embodiment and another vehicle traveling in front thereof.

A ninth embodiment will be described with reference to FIGS. 16 and 17. FIG. 16 is a graph showing a relationship between the actual pedal stroke amount and the corrected pedal stroke amount over time when the second mode is selected in the brake system 1 according to the ninth embodiment. FIG. 16 shows both of a state in which the driver stops or decelerates the vehicle by the normal operation, and a state in which the driver suddenly applies the pedaling force to the brake pedal 2 (i.e., applies a sudden brake) to stop the vehicle.

The solid lines H2, and F2 and the dashed line E2 in FIG. 16 indicate the state when the driver stops or decelerates the vehicle by the normal operation. Specifically, as indicated by the solid line H2, the actual pedal stroke amount and the corrected pedal stroke amount match from time T20 to time T22. Further, from time T22 to time T23, the actual pedal stroke amount is indicated by the one-dot chain line E2, and the corrected pedal stroke amount during that period is indicated by the solid line F2.

When the driver stops or decelerates the vehicle by the normal operation, the driver starts applying the pedaling force to the brake pedal 2 after time T20. Since the ECU 4 executes the normal control from time T20 to time T22, the actual pedal stroke amount and the corrected pedal stroke amount match during that period.

At time T22, the actual pedal stroke amount reaches the set value θset. As indicated by the one-dot chain line E2, from time T22 to time T23, the actual pedal stroke amount is between the first threshold value θ1 and the second threshold value θ2. Therefore, as indicated by the solid line F2, from time T22 to time T23, the ECU 4 executes the constant braking force control to generate the corrected pedal stroke amount at a constant value θset. Therefore, from time T22 to time T23, the braking force is kept at a constant value based on the corrected pedal stroke amount. On the other hand, the solid line X in FIG. 16 shows the state in which the driver suddenly applies the pedaling force to the brake pedal 2 (i.e., applies the brake suddenly) to stop or decelerate the vehicle suddenly. At this time, the driver instantaneously requests a larger braking force than usual (that is, a braking force corresponding to θ>θ2) due to a sudden braking.

If there is no control regulation for the pedal operation during sudden braking, the control is temporarily shifted to "constant braking force control" without exception, and once the pedal stroke amount exceeds the second threshold value θ2, the control is shifted again to the normal control. This behavior is considered to be undesirable in a scene in which a large braking force corresponding to θ>θ2 is required instantaneously.

As shown by the solid line X in FIG. 16, the pedal operation when the driver instantaneously requests a braking force greater than normal (that is, a braking force corresponding to θ>θ2) is considered to be substantially equivalent to a large time rate of change of the pedal stroke amount. The time rate of change of the pedal stroke amount is represented by Δθ/ΔT in FIG. 16, and can be rephrased as the increase rate of the pedal stroke amount per unit time. The ECU 4 temporarily turns off the function of the automatic braking force control even if the second mode is selected when the time rate of change of the pedal stroke amount exceeds a certain threshold value before the pedal stroke amount reaches θset, and executes the normal control overall range of the pedal stroke amount. That is, in FIG. 16, since the time rate of change of the pedal stroke amount (that is, Δθ/ΔT) exceeds a certain threshold before time T21 when the pedal stroke amount reaches θset, the ECU 4 turns off the function of automatic braking force control and executes the normal control. In a scene where the braking force corresponding to θ>θ2 is required instantaneously, it is possible to prevent the driver from feeling uncomfortable due to a step in the braking force.

In many cases, the operation with a large rate (that is, Δθ/ΔT) of change of the pedal stroke amount over time is considered to be due to a sudden change in the external environment other than the own vehicle, and to stepping on the brake pedal 2 strongly on the spur of the moment. As an example, as shown in FIG. 17, there is a case where the inter-vehicle distance VD between the own vehicle 100 equipped with the brake system 1 according to the present embodiment and another vehicle 200 traveling in front of the own vehicle 100 suddenly narrows. If the own vehicle 100 is equipped with sensors that can identify the influence of the external environment, the ECU 4 can use information obtained from the sensors to determine whether the function is temporarily turned off.

In the ninth embodiment described above, when the second mode is selected and the rate of change over time of the pedal stroke amount is greater than a predetermined threshold value before the pedal stroke amount increases and reaches the predetermined set value θset, the ECU 4 does not execute the automatic braking force control, but switches to the normal control and executes it. The time rate of change of the pedal stroke amount can also be rephrased as an increase rate of the pedal stroke amount per unit time.

According to this configuration, in the scene where the driver desires that the braking force corresponding to the pedal stroke amount equal to or greater than the second threshold value θ2 is instantaneously generated, the ECU 4 switches the automatic braking force control to the normal control. As a result, it is possible to prevent discomfort caused by a change in the braking force when switching from the automatic braking force control to the normal control when the pedal stroke amount is equal to or greater than the second threshold value θ2.

Other Embodiments (1) In each of the embodiments described above, the constant braking force control for keeping the braking force constant is described as an example of the braking force control executed when the pedal stroke amount is between the first threshold θ1 and the second threshold θ2, but the braking force control is not limited to this configuration. For example, as the automatic braking force control, the braking force may be gradually decreased when the vehicle speed becomes smaller than a predetermined vehicle speed threshold (that is, when the vehicle is about to stop) while the braking force is being controlled to be constant. As a result, the deceleration G before and after the vehicle stops can be reduced.

(2) In addition, for example, as the automatic braking force control, when the information required to stop the vehicle due to such as a stop line in front of the vehicle is confirmed while control the braking force constant, the braking force may be controlled so that the vehicle stops in front of the stop line.

(3) Further, for example, as the automatic braking force control, the braking force may gradually decrease with the lapse of time.

(4) For example, as the automatic braking force control, braking force feedback-controlled may be performed to achieve constant deceleration G, or braking force feedback-controlled may be performed to gradually reduce the deceleration G with the lapse of time.

(5) In each of the above-described embodiments, the ECU 4 is composed of the first ECU 41 and the second ECU 42. However, the ECU 4 may be composed of a single unit or may be composed of three or more.

(6) In each figure referred to in each of the above embodiments, the "basic characteristics", which are the basic relationships between the pedal stroke amount and the braking force, are linear, but these basic characteristics are examples, and the basic characteristics are non-linear.

The present disclosure is not limited to the above-described embodiments and can be appropriately modified.

The above-described embodiments are not independent of each other and can be appropriately combined together except when the combination is obviously impossible.

The constituent element(s) of each of the above embodiments is/are not necessarily essential unless it is specifically stated that the constituent element(s) is/are essential in the above embodiment, or unless the constituent element(s) is/are obviously essential in principle.

A quantity, a value, an amount, a range, or the like referred to in the description of the embodiments described above is not necessarily limited to such a specific value, amount, range or the like unless it is specifically described as essential or understood as being essential in principle.

Furthermore, a shape, positional relationship or the like of a structural element, which is referred to in the embodiments described above, is not limited to such a shape, positional relationship or the like, unless it is specifically described or obviously necessary to be limited in principle.

The control apparatus and the technique according to the present disclosure may be achieved by a dedicated computer provided by constituting a processor and a memory programmed to execute one or more functions embodied by a computer program. Alternatively, the controller and the technique according to the present disclosure may be achieved by a dedicated computer provided by constituting a processor with one or more dedicated hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

What is claimed is:

1. A brake system mounted on a vehicle, comprising:

a brake device having a brake pedal operated by a pedaling force applied by a driver, and a sensor configured to output a signal corresponding to a stroke amount of the brake pedal;

a brake circuit configured to generate a braking force for braking the vehicle by supplying hydraulic pressure to wheel cylinders arranged on each wheel of the vehicle;

an electronic control unit configured to control the braking force generated by the brake circuit according to the stroke amount of the brake pedal detected based on the output signal of the sensor; and a user interface configured to allow the driver to instruct the electronic control unit to select between a first mode and a second mode, wherein the electronic control unit is further configured to:

when the first mode is selected, execute a normal control for controlling the braking force generated by the brake circuit based on a basic characteristics that is a basic relationship between the stroke amount and the braking force that increases the braking force as the stroke amount increases and decreases the braking force as the stroke amount decreases, when the second mode is selected, execute an automatic braking force control to set the braking force generated by the brake circuit to a predetermined braking force, when the stroke amount is between a first threshold value smaller than a set value and a second threshold value larger than the set value after the stroke amount increases and reaches a predetermined set value, and execute a normal control to control the braking force generated by the brake circuit with the braking force based on the basic characteristics, when the stroke amount exceeds the second threshold value; and in the second mode, even if a fluctuation of the stroke amount occurs, the automatic braking force control keeps the braking force generated by the brake circuit at the predetermined braking force as long as the stroke amount is between the first threshold value and the second threshold value.

2. The brake system according to claim 1, wherein the user interface is configured so that at least one of the set value and the braking force when the automatic braking force control is executed is continuously or stepwise adjusted by an operation of the driver.

3. The brake system according to claim 1, wherein the predetermined braking force in the second mode does not depend on the fluctuation of the stroke amount but depends on speed of the vehicle.

4. The brake system according to claim 1, wherein the predetermined braking force in the second mode does not depend on the fluctuation of the stroke amount but depends on information on a stop line in front of the vehicle.

5. The brake system according to claim 1, wherein the predetermined braking force in the second mode does not depend on the fluctuation of the stroke amount but depends on lapse of time.

6. The brake system according to claim 1, wherein the predetermined braking force in the second mode causes constant deceleration or gradual deceleration reduction with lapse of time, without depending on the fluctuation of the stroke amount.

7. The brake system according to claim 1, wherein in the second mode, even if the fluctuation of the stroke amount occurs, the automatic braking force control keeps the braking force generated by the brake circuit at the predetermined braking force which is independent of the fluctuation of the stroke amount, as long as the stroke amount is between the first threshold value and the second threshold value.

8. A brake system mounted on a vehicle, comprising:

a brake device having a brake pedal operated by a pedaling force applied by a driver, and a sensor configured to output a signal corresponding to a stroke amount of the brake pedal;

a brake circuit configured to generate a braking force for braking the vehicle by supplying hydraulic pressure to wheel cylinders arranged on each wheel of the vehicle;

an electronic control unit configured to control the braking force generated by the brake circuit according to the stroke amount of the brake pedal detected based on the output signal of the sensor; and a user interface configured to allow the driver to instruct the electronic control unit to select between a first mode and a second mode, wherein the electronic control unit is further configured to:

when the first mode is selected, execute a normal control for controlling the braking force generated by the brake circuit based on a basic characteristics that is a basic relationship between the stroke amount and the braking force that increases the braking force as the stroke amount increases and decreases the braking force as the stroke amount decreases, when the second mode is selected, execute an automatic braking force control to set the braking force generated by the brake circuit to a predetermined braking force, when the stroke amount is between a first threshold value smaller than a set value and a second threshold value larger than the set value after the stroke amount increases and reaches a predetermined set value, and execute a normal control to control the braking force generated by the brake circuit with the braking force based on the basic characteristics, when the stroke amount exceeds the second threshold value; and when the electronic control unit determines that there is a possibility that the wheel may slip based on information about a directly measured or estimated road surface friction coefficient, the electronic control unit executes at least one of a braking force changing process for setting the braking force smaller than a predetermined braking force and a mode changing process for changing the second mode to the first mode, and further notify the driver that the braking force changing process or the mode changing process is executed.

9. A brake system mounted on a vehicle, comprising:

a brake device having a brake pedal operated by a pedaling force applied by a driver, and a sensor configured to output a signal corresponding to a stroke amount of the brake pedal;

a brake circuit configured to generate a braking force for braking the vehicle by supplying hydraulic pressure to wheel cylinders arranged on each wheel of the vehicle;

an electronic control unit configured to control the braking force generated by the brake circuit according to the stroke amount of the brake pedal detected based on the output signal of the sensor; and a user interface configured to allow the driver to instruct the electronic control unit to select between a first mode and a second mode, wherein the electronic control unit is further configured to:

when the first mode is selected, execute a normal control for controlling the braking force generated by the brake circuit based on a basic characteristics that is a basic relationship between the stroke amount and the braking force that increases the braking force as the stroke amount increases and decreases the braking force as the stroke amount decreases, when the second mode is selected, execute an automatic braking force control to set the braking force generated by the brake circuit to a predetermined braking force, when the stroke amount is between a first threshold value smaller than a set value and a second threshold value larger than the set value after the stroke amount increases and reaches a predetermined set value, and execute a normal control to control the braking force generated by the brake circuit with the braking force based on the basic characteristics, when the stroke amount exceeds the second threshold value;

the brake system further comprises a reaction force generating mechanism configured to generate a reaction force against the pedaling force applied to the brake pedal by the driver; and the reaction force generating mechanism has one or more inflection points that change the relationship between the stroke amount and the reaction force, and at least one inflection point is set to a pedal stroke amount corresponding to the set value.

10. A brake system mounted on a vehicle, comprising:

a brake device having a brake pedal operated by a pedaling force applied by a driver, and a sensor configured to output a signal corresponding to a stroke amount of the brake pedal;

a brake circuit configured to generate a braking force for braking the vehicle by supplying hydraulic pressure to wheel cylinders arranged on each wheel of the vehicle;

an electronic control unit configured to control the braking force generated by the brake circuit according to the stroke amount of the brake pedal detected based on the output signal of the sensor; and a user interface configured to allow the driver to instruct the electronic control unit to select between a first mode and a second mode, wherein the electronic control unit is further configured to:

when the first mode is selected, execute a normal control for controlling the braking force generated by the brake circuit based on a basic characteristics that is a basic relationship between the stroke amount and the braking force that increases the braking force as the stroke amount increases and decreases the braking force as the stroke amount decreases, when the second mode is selected, execute an automatic braking force control to set the braking force generated by the brake circuit to a predetermined braking force, when the stroke amount is between a first threshold value smaller than a set value and a second threshold value larger than the set value after the stroke amount increases and reaches a predetermined set value, and execute a normal control to control the braking force generated by the brake circuit with the braking force based on the basic characteristics, when the stroke amount exceeds the second threshold value; and when a time zone in which the directly measured or estimated vertical acceleration of the vehicle changes more than a predetermined acceleration threshold value, and a time zone in which the stroke amount deviates from a region between the first threshold value and the second threshold value overlap at least partially, the electronic control unit maintain the automatic braking force control.

11. A brake system mounted on a vehicle, comprising:

a brake device having a brake pedal operated by a pedaling force applied by a driver, and a sensor configured to output a signal corresponding to a stroke amount of the brake pedal;

a brake circuit configured to generate a braking force for braking the vehicle by supplying hydraulic pressure to wheel cylinders arranged on each wheel of the vehicle;

an electronic control unit configured to control the braking force generated by the brake circuit according to the stroke amount of the brake pedal detected based on the output signal of the sensor; and a user interface configured to allow the driver to instruct the electronic control unit to select between a first mode and a second mode, wherein the electronic control unit is further configured to:

when the first mode is selected, execute a normal control for controlling the braking force generated by the brake circuit based on a basic characteristics that is a basic relationship between the stroke amount and the braking force that increases the braking force as the stroke amount increases and decreases the braking force as the stroke amount decreases, when the second mode is selected, execute an automatic braking force control to set the braking force generated by the brake circuit to a predetermined braking force, when the stroke amount is between a first threshold value smaller than a set value and a second threshold value larger than the set value after the stroke amount increases and reaches a predetermined set value, and execute a normal control to control the braking force generated by the brake circuit with the braking force based on the basic characteristics, when the stroke amount exceeds the second threshold value; and when the second mode is selected and a rate of increase of the stroke amount per unit time is greater than a predetermined threshold value before the stroke amount increases and reaches the set value, the electronic control unit is switched to the normal control without executing the automatic braking force control.

12. An electronic control unit used in a brake system mounted on a vehicle, comprising:

the brake system including a brake device having a brake pedal operated by a pedaling force applied by a driver, and a sensor configured to output a signal corresponding to a stroke amount of the brake pedal;

a brake circuit configured to generate a braking force for braking the vehicle by supplying hydraulic pressure to wheel cylinders arranged on each wheel of the vehicle;

an electronic control unit configured to control the braking force generated by the brake circuit according to the stroke amount of the brake pedal detected based on the output signal of the sensor; and a user interface configured to allow the driver to instruct the electronic control unit to select between a first mode and a second mode, wherein the electronic control unit is further configured to:

when the first mode is selected, execute a normal control for controlling the braking force generated by the brake circuit based on a basic characteristics that is a basic relationship between the stroke amount and the braking force that increases the braking force as the stroke amount increases and decreases the braking force as the stroke amount decreases, when the second mode is selected, execute an automatic braking force control to set the braking force generated by the brake circuit to a predetermined braking force, when the stroke amount is between a first threshold value smaller than a set value and a second threshold value larger than the set value after the stroke amount increases and reaches a predetermined set value, and execute a normal control to control the braking force generated by the brake circuit with the braking force based on the basic characteristics, when the stroke amount exceeds the second threshold value, in the second mode, even if a fluctuation of the stroke amount occurs, the automatic braking force control keeps the braking force generated by the brake circuit at the predetermined braking force as long as the stroke amount is between the first threshold value and the second threshold value.

13. The electronic control unit according to claim 12, wherein in the second mode, even if the fluctuation of the stroke amount occurs, the automatic braking force control keeps the braking force generated by the brake circuit at the predetermined braking force which is independent of the fluctuation of the stroke amount, as long as the stroke amount is between the first threshold value and the second threshold value.

* * * * *